US012799397B2

(12) United States Patent
Inada

(10) Patent No.: US 12,799,397 B2
(45) Date of Patent: Nov. 17, 2026

(54) COMPOSITION, LIQUID CRYSTAL FILM, FILM, DISPLAY DEVICE, AND DISPERSANT

(71) Applicant: FUJIFILM CORPORATION, Tokyo (JP)

(72) Inventor: Hiroshi Inada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 19/082,178

(22) Filed: Mar. 18, 2025

(65) Prior Publication Data

US 2025/0215324 A1 Jul. 3, 2025

Related U.S. Application Data

(63) Continuation of application No. PCT/JP2023/035528, filed on Sep. 28, 2023.

(30) Foreign Application Priority Data

Sep. 29, 2022 (JP) ................................ 2022-156392
Aug. 31, 2023 (JP) ................................ 2023-141656

(51) Int. Cl.

| | |
|---|---|
| ***C09K 19/54*** | (2006.01) |
| ***C09K 19/04*** | (2006.01) |
| ***C09K 19/38*** | (2006.01) |
| ***C09K 19/52*** | (2006.01) |
| ***G02F 1/1334*** | (2006.01) |

(52) U.S. Cl.

CPC ........ *C09K 19/544* (2013.01); *C09K 19/3852* (2013.01); *C09K 2019/0448* (2013.01); *C09K 2019/521* (2013.01); *C09K 2219/03* (2013.01); *G02F 1/1334* (2013.01)

(58) Field of Classification Search

CPC .................................................... C09K 19/544
See application file for complete search history.

(56) References Cited

U.S. PATENT DOCUMENTS

2015/0166783 A1 6/2015 Arayama et al.

FOREIGN PATENT DOCUMENTS

| | | | | | |
|---|---|---|---|---|---|
| CN | 104335108 | A | * | 2/2015 | G02F 1/1334 |
| EP | 2891685 | A1 | * | 7/2015 | C09D 201/08 |
| JP | 2007-279688 | A | | 10/2007 | |
| JP | 2011-145490 | A | | 7/2011 | |
| JP | 2014-062221 | A | | 4/2014 | |
| WO | WO-2014034814 | A1 | * | 3/2014 | G03F 7/0047 |
| WO | 2021/033482 | A1 | | 2/2021 | |
| WO | WO-2021020287 | A1 | * | 2/2021 | G02B 5/30 |

OTHER PUBLICATIONS

Machine Translation of CN 104335108 (Year: 2026).*
English Machine Translation of WO2021020287 A1 (Year: 2026).*
Machine Translation of WO 2021020287 (Year: 2026).*
International Search Report issued in International Application No. PCT/JP2023/035528 on Dec. 5, 2023.
Written Opinion of the ISA issued in International Application No. PCT/JP2023/035528 on Dec. 5, 2023.

* cited by examiner

*Primary Examiner* — Chanceity N Robinson
(74) *Attorney, Agent, or Firm* — SOLARIS Intellectual Property Group, PLLC

(57) ABSTRACT

A composition includes particles having a refractive index of 1.8 or more, a polymer compound represented by Formula (1), and a solvent. Formula (1) as a whole has at least one mesogen structure, m+n is from 2 to 10, $A^1$ represents a monovalent group having at least one kind of group selected from the group consisting of an acid group, a urea group, a urethane group, a group having a coordinating oxygen atom, a group having a basic nitrogen atom, a phenol group, an alkyl group, an aryl group, a group having an alkyleneoxy chain, an imide group, an alkyloxycarbonyl group, an alkylaminocarbonyl group, a carboxylic acid salt group, a sulfonamide group, a heterocyclic group, an alkoxysilyl group, an epoxy group, an isocyanate group, and a hydroxy group, $P^1$ represents a polymer chain.

$$(A^1-R^2)_n R^1 -(P^1)_m \quad (1)$$

2 Claims, No Drawings

COMPOSITION, LIQUID CRYSTAL FILM, FILM, DISPLAY DEVICE, AND DISPERSANT

CROSS-REFERENCE TO RELATED APPLICATIONS

This application is a continuation application of International Application No. PCT/JP2023/035528, filed Sep. 28, 2023, the disclosure of which is incorporated herein by reference in its entirety. Further, this application claims priority from Japanese Patent Application No. 2022-156392, filed Sep. 29, 2022, and Japanese Patent Application No. 2023-141656, filed Aug. 31, 2023, the disclosures of which are incorporated herein by reference in their entireties.

TECHNICAL FIELD

The present disclosure relates to a composition, a liquid crystal film, a film, a display device, and a dispersant.

RELATED ART

Known dispersion compositions include a dispersion composition disclosed in Patent Document 1.

Patent Document 1 describes a dispersion composition, the dispersion composition including a substance to be dispersed, a dispersant, and a polymer [P] that is at least one selected from the group consisting of a polyamic acid, a polyamic acid ester, and a polyimide, and that includes a structural unit U1 derived from a diamine compound [D1] represented by the following formula and a structural unit U2 derived from a diamine compound [D2] that is different from the diamine compound [D1].

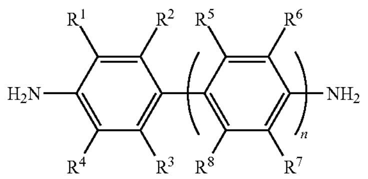

In the above formula, n is 0 or 1. When n is 0, at least one of $R^1$ to $R^4$ is a monovalent group having an ionic functional group, and the rest of $R^1$ to $R^4$ each independently represents a hydrogen atom, a halogen atom, or a monovalent organic group. When n is 1, at least one of $R^1$ to $R^8$ is a monovalent group having an ionic functional group, and the rest of $R^1$ to $R^8$ each independently represents a hydrogen atom, a halogen atom or a monovalent organic group.

Known non-electrophoretic particles include those described in Patent Document 2. Patent Document 2 describes a non-electrophoretic particle, the non-electrophoretic particle including a mother particle that contains a coloring agent and, on the surface of the mother particle, a liquid-crystal-group-containing copolymer that is adsorbed at an absorption rate of from 0.01% by mass to 50% by mass of the mother particles and that is obtained by polymerization of monomers including at least a monomer having a liquid crystal group.

Patent Document 1: International Publication (WO) No. 2021/033482

Patent Document 2: Japanese Patent Application Laid-open (JP-A) No. 2011-145490

SUMMARY OF INVENTION

A problem to be solved by one embodiment of the present disclosure is to provide a composition having an excellent dispersion stability of particles having a refractive index of 1.8 or more.

Another problem to be solved by another embodiment of the present disclosure is to provide a liquid crystal film, film, or display device in which the composition is used.

A still further problem to be solved by another embodiment of the present disclosure is to provide a dispersant that imparts an excellent dispersion stability to particles having a refractive index of 1.8 or more.

Means for solving the problems include the following aspects.

<1> A composition, including particles having a refractive index of 1.8 or more, a polymer compound represented by the following Formula (1), and a solvent:

$$(A^1—R^2 \frac{\ \ }{)_n} R^1 \frac{\ \ }{(} P^1)_m \quad (1)$$

wherein, in Formula (1), m represents a positive number of 8 or less; n represents a number of from 1 to 9; m+n is from 2 to 10; Formula (1) as a whole has at least one mesogen structure, $R^1$ represents an (m+n)-valent connecting group; $R^2$ represents a single bond or a divalent connecting group; $A^1$ represents a monovalent group having at least one kind of group selected from the group consisting of an acid group, a urea group, a urethane group, a group having a coordinating oxygen atom, a group having a basic nitrogen atom, a phenol group, an alkyl group, an aryl group, a group having an alkyleneoxy chain, an imide group, an alkyloxycarbonyl group, an alkylaminocarbonyl group, a carboxylic acid salt group, a sulfonamide group, a heterocyclic group, an alkoxysilyl group, an epoxy group, an isocyanate group, and a hydroxy group; n $A^1$'s and n $R^2$'s may be the same or different; $P^1$ represents a polymer chain; and m $P^1$'s may be the same or different.

<2> The composition according to <1>, further including a liquid crystal compound.

<3> The composition according to <1> or <2>, wherein the average primary particle size of the particles having a refractive index of 1.8 or more is from 1 nm to 300 nm.

<4> The composition according to any one of <1> to <3>, wherein the weight average molecular weight of the polymer compound represented by Formula (1) is from 3,000 to 10,000.

<5> The composition according to any one of <1> to <4>, wherein the polymer compound represented by Formula (1) has liquid crystallinity.

<6> The composition according to any one of <1> to <5>, wherein $A^1$ is a group having a functional group having a pKa of 5 or less.

<7> The composition according to any one of <1> to <6>, wherein the particles having a refractive index of 1.8 or more are at least one kind of particle selected from the group consisting of zirconium oxide particles and titanium oxide particles.

<8> The composition according to <1>, wherein the composition is a dispersion composition of the particles having a refractive index of 1.8 or more.

<9> A liquid crystal film obtained by removing at least a part of the solvent from the composition according to <2>.

<10> A film, including a liquid crystal layer formed by curing the liquid crystal film according to <9>.

<11> A display device, including the film according to <10>.

<12> A dispersant, including a polymer compound represented by the following Formula (1):

$$(A^1-R^2)_n R^1 (P^1)_m \qquad (1)$$

wherein, in Formula (1), m represents a positive number of 8 or less; n represents a number of from 1 to 9; m+n is from 2 to 10; Formula (1) as a whole has at least one mesogen structure, $R^1$ represents an (m+n)-valent connecting group; $R^2$ represents a single bond or a divalent connecting group; $A^1$ represents a monovalent group having at least one kind of group selected from the group consisting of an acid group, an alkyl group, and an aryl group; n $A^1$'s and n $R^2$'s may be the same or different; $P^1$ represents a polymer chain; and m $P^1$'s may be the same or different, provided that at least one of n $A^1$'s represents an alkyl group having an acid group or an aryl group having an acid group.

<13> The dispersant according to <12>, wherein m+n is from 3 to 6, and at least one of n $A^1$'s is a $C_1$-$C_{12}$ alkyl group having from 1 to 3 carboxylic acid groups or a $C_6$-$C_{10}$ aryl group having from 1 to 3 carboxylic acid groups.

According to one embodiment of the present disclosure, a composition having an excellent dispersion stability of particles having a refractive index of 1.8 or more can be provided.

According to another embodiment of the present disclosure, a liquid crystal film, film, or display device in which the composition is used can be provided.

According to another embodiment of the present disclosure, a dispersant that imparts an excellent dispersion stability to particles having a refractive index of 1.8 or more can be provided.

MODES FOR CARRYING OUT INVENTION

Explanations according to the present disclosure are provided below. However, the present disclosure is by no means limited to the embodiments described below, and modifications may be made, as appropriate, within the purpose of the present disclosure.

Any reference to a group (atomic group) described in the present disclosure encompasses the unsubstituted version of the group and substituted versions of the group unless the group is indicated to be substituted or unsubstituted. For example, the scope of the term "alkyl group" encompasses not only an alkyl group having no substituents (i.e., an unsubstituted alkyl group) but also an alkyl group having a substituent (i.e., a substituted alkyl group).

The term "light" in the present disclosure means actinic rays or a radiation.

The term "actinic rays" or "radiation" in the present disclosure means, for example, the emission line spectrum of a mercury light, a far ultraviolet radiation typified by an excimer laser, an extreme ultraviolet radiation (EUV radiation), X rays, and an electron beam (EB).

The scope of the term "light exposure" in the present disclosure encompasses exposure to the emission line spectrum of a mercury light, a far ultraviolet radiation typified by an excimer laser, an extreme ultraviolet radiation, X rays, a EUV radiation, or the like, as well as exposure to a particle radiation such as an electron beam or an ion beam.

In the present disclosure, "from . . . to . . . " is used in the sense that the values indicated before and after "to" as the lower and upper limit values.

In the present disclosure, "(meth)acrylate" refers to acrylate and methacrylate, and "(meth)acrylic" refers to acrylic and methacrylic.

In the present disclosure, the weight average molecular weight (Mw) of a resin component, the number average molecular weight (Mn) of the resin component, and the dispersity (Mw/Mn, also referred to as "molecular weight distribution") of the resin component are defined as polystyrene-equivalent values in a GPC measurement using a gel permeation chromatography (GPC) apparatus (HLC-8120GPC manufactured by Tosoh Corporation) (solvent: tetrahydrofuran; flow volume (sample injection amount): 10 μL, column: TSK gel Multipore HXL-M manufactured by Tosoh Corporation, column temperature: 40 °C, flow rate: 1.0 mL/min., detector: refractive index detector).

In the present disclosure, when plural substances that each correspond to a particular component are present in a composition, the amount of the component in the composition means the total amount of the plural substances present in the composition, unless otherwise specified.

In the present disclosure, the scope of the term "step" encompasses not only an independent step, but also a step that is not clearly distinguished from another step, as far as the desired purpose of the step of interest is achieved.

In the present disclosure, the term "total solids content" refers to the total mass of the components, except for solvents, included in the entire composition. In addition, the term "solids content" refers to the components, except for solvents, included in the entire composition, and the solids may be either solid or liquid at 25 °C.

In the present disclosure, the term "% by mass" and the term "% by weight" have the same meaning, and the term "parts by mass" and the term "parts by weight" have the same meaning.

In the present disclosure, a combination of two or more preferable aspects constitutes a more preferable aspect.

(Composition)

The composition according to the present disclosure includes particles having a refractive index of 1.8 or more, a polymer compound represented by the following Formula (1), and a solvent.

The composition according to the present disclosure preferably further includes a liquid crystal compound. The composition according to the present disclosure has an excellent dispersion stability even in a case in which a liquid crystal compound having a tendency toward lowered dispersion stability is added.

Further, the composition according to the present disclosure is suitably used as a dispersion composition of the particles having a refractive index of 1.8 or more.

$$(A^1-R^2)_n R^1 (P^1)_m \qquad (1)$$

In Formula (1), m represents a positive number of 8 or less; n represents a number of from 1 to 9; m+n is from 2 to 10; Formula (1) as a whole has at least one mesogen structure, $R^1$ represents an (m+n)-valent connecting group; $R^2$ represents a single bond or a divalent connecting group; $A^1$ represents a monovalent group having at least one kind of group selected from the group consisting of an acid group, a urea group, a urethane group, a group having a coordinating oxygen atom, a group having a basic nitrogen atom, a phenol group, an alkyl group, an aryl group, a group having an alkyleneoxy chain, an imide group, an alkyloxycarbonyl group, an alkylaminocarbonyl group, a carboxylic acid salt group, a sulfonamide group, a heterocyclic group, an alkoxysilyl group, an epoxy group, an isocyanate group, and a hydroxy group; n $A^1$'s and n $R^2$'s may be the same or different; $P^1$ represents a polymer chain; and m $P^1$'s may be the same or different.

In conventional compositions that include particles having a refractive index of 1.8 or more, the particles having a refractive index of 1.8 or more tend to form aggregates or the like, and, in many cases, the dispersion stability is insufficient.

As a result of detailed study conducted by the present inventor, the inventor has found that a composition having an excellent dispersion stability of particles having a refractive index of 1.8 or more can be obtained according to the aspects described above.

The inventor surmises that, as a result of the inclusion of the polymer compound represented by Formula (1), which has a mesogen structure and a group represented by $A^1$ having a specific functional group, $A^1$ works as an adsorptive group adsorbing on the particles having a refractive index of 1.8 or more, the mesogen structure reduces aggregation of the particles having a refractive index of 1.8 or more, and the specific structure represented by Formula (1) enables the tendency to adsorb on the particles having a refractive index of 1.8 or more and the tendency to reduce aggregation of the particles having a refractive index of 1.8 or more to be well balanced, whereby an excellent dispersion stability of particles having a refractive index of 1.8 or more is achieved.

Further, the inclusion of the polymer compound represented by Formula (1), which has a mesogen structure, not only provides an excellent dispersion stability of the particles having a refractive index of 1.8 or more as described above, but also enables reduction of deterioration of the alignment of liquid crystal due to the particles having a refractive index of 1.8 or more at the time of aligning the liquid crystal, through improved compatibility between the mesogen structure and a liquid crystal compound attributable to interaction therebetween, in a case in which the liquid compound is also included. In a case in which a liquid crystal film is formed, the foregoing effect enables the resultant liquid crystal film to have a low haze value.

[Particles Having a Refractive Index of 1.8 or More]

The composition according to the present disclosure includes particles having a refractive index of 1.8 or more. Examples of the particles having a refractive index of 1.8 or more include metal oxide particles having a refractive index of 1.8 or more, and nanodiamond particles.

Among them, the particles are preferably at least one kind of particle selected from the group consisting of zirconium oxide particles, titanium oxide particles, and nanodiamond particles, more preferably at least one kind of particle selected from the group consisting of zirconium oxide particles and titanium oxide particles, and particularly preferably zirconium oxide particles, from the viewpoint of achieving high refractive index and of facilitating the exertion of the effect according to the present disclosure.

Here, the term "nanodiamond particles" refers to nanoparticles having a diamond crystal structure and a particle size of less than 1 μm.

The titanium oxide particles in the present disclosure is preferably titanium dioxide particles. The titanium dioxide particles can be represented by $TiO_2$, and preferably have a purity of 70% or higher, more preferably have a purity of 80% or higher, and still more preferably have a purity of 85% or higher. The content of titanium oxide with a lower degree of oxidation represented by $Ti_nO_{2n-1}$ (n representing a number from 2 to 4), titanium oxynitride, and the like in the titanium dioxide particles is preferably 30% by mass or less, more preferably 20% by mass or less, and still more preferably 15% by mass or less. The zirconium dioxide particles in the present disclosure can be represented by $ZrO_2$, and preferably have a purity of 70% or higher, more preferably have a purity of 80% or higher, and still more preferably have a purity of 85% or higher.

The average primary particle size of the particles having a refractive index of 1.8 or more is preferably from 1 nm to 300 nm, more preferably from 1 nm to 100 nm, still more preferably from 1 nm to 80 nm, and particularly preferably from 1 nm to 50 nm, from the viewpoint of facilitating the exertion of the effect according to the present disclosure.

The average primary particle size of particles in the present disclosure refers to a value that is obtained by: 80-fold diluting a composition containing the particles with propyleneglycol monomethyl ether acetate; and carrying out measurement on the resultant dilution solution using the dynamic light scattering method.

A number average particle size obtained using a Microtrac UPA-EX150 manufactured by Nikkiso Co., Ltd. may be taken as the measurement value.

The refractive index of the particles having a refractive index of 1.8 or more may be any value that is 1.8 or more, and is preferably from 1.85 to 2.70, more preferably from 1.90 to 2.70, and particularly preferably from 2.00 to 2.70, from the viewpoint of obtaining high refractive index.

Refractive index in the present disclosure refers to refractive index at 25 °C.

The refractive index of particles is measured by the following method.

The particles are placed on a slide glass, an organic compound of which the refractive index is known or a mixture of two or more such organic compounds (both being collectively referred to as "compound for measurement") is added thereto, and covered with a cover glass. Thereafter, observation is carried out at 25 °C using a (transmission) optical microscope, the kind or composition of the compound for measurement with which the particles are least visible is determined, and the refractive index of the compound for measurement is measured using a multi-wavelength Abbe refractometer (DR-M2, manufactured by Atago Co., Ltd.). The measurement wavelength is set to 589 nm, and the measurement temperature is set to 25 °C.

The specific surface area of the particles having a refractive index of 1.8 or more is preferably from 10 $m^2/g$ to 400 $m^2/g$, more preferably from 20 $m^2/g$ to 200 $m^2/g$, and most preferably from 30 $m^2/g$ to 150 $m^2/g$.

The shape of the particles having a refractive index of 1.8 or more is not particularly limited, and may be, for example, a rice grain shape, a spherical shape, a cubic shape, a spindle shape, or an amorphous shape.

The particles having a refractive index of 1.8 or more may have been surface-treated with an organic compound or the like.

The surface treatment may be carried out using a known method.

The surface treatment may be carried out using only one surface treatment agent, or may be carried out using two or more surface treatment agents in combination.

As the particles having a refractive index of 1.8 or more, commercially available products can preferably be used.

Examples of commercially available products of titanium dioxide particles include TTO series products (such as TTO-51(A) or TTO-51(C)) and TTO-S and TTO-V series products (such as TTO-S-1, TTO-S-2, and TTO-V-3) manufactured by Ishihara Sangyo Kaisha Ltd., MT series products (such as MT-01 and MT-05) manufactured by Teika Corporation, and NANOUSE OT series products (manufactured by Nissan Chemical Corporation).

Commercially available products of zirconium dioxide particles include UEP products (manufactured by Daiichi Kigenso Kagaku Kogyo Co., Ltd.), PCS products (manufactured by Nitto Denko Corporation), JS-01, JS-03, and JS-04 products (manufactured by Nitto Denko Corporation), UEP-100 products (manufactured by Daiichi Kigenso Kagaku Kogyo Co., Ltd.), SZR series products (manufactured by Sakai Chemical Industry Co., Ltd.), and NANOUSE OZ series products (manufactured by Nissan Chemical Corporation).

Only one kind of particle having a refractive index of 1.8 or more may be used, or two or more kinds of particles having a refractive index of 1.8 or more may be used in combination.

From the viewpoint of obtaining dispersion stability, reduced haze, and high refractivity, the content of particles having a refractive index of 1.8 or more is preferably from 1% by mass to 90% by mass, more preferably from 2% by mass to 80% by mass, and particularly preferably from 3% by mass to 70% by mass, with respect to the total solids content of the composition.

When the composition according to the present disclosure does not include a liquid crystal compound, the content of particles having a refractive index of 1.8 or more with respect to the total solids content of the composition is preferably 20% by mass to 90% by mass, more preferably from 40% by mass to 80% by mass, and particularly preferably from 50% by mass to 70% by mass, from the viewpoint of obtaining dispersion stability and high refractive index.

When the composition according to the present disclosure includes a liquid crystal compound, the content of particles having a refractive index of 1.8 or more with respect to the total solids content of the composition is preferably from 1% by mass to 50% by mass, more preferably from 2% by mass to 30% by mass, and particularly preferably from 3% by mass to 20% by mass, from the viewpoint of obtaining dispersion stability and reduced haze.

[Polymer Compound Represented by Formula (1)]

The composition according to the present disclosure includes a polymer compound represented by Formula (1).

Formula (1), as a whole, has at least one mesogen structure, and the mesogen structure may be present in any of $A^1$, $R^1$, $R^2$, or $P^1$.

Among them, the mesogen structure is preferably present in $P^1$ from the viewpoint of dispersion stability and haze reduction.

The kind of mesogen structure is not limited. Known mesogen structures, for example, may be used as the mesogen structure. Mesogen structures are described, for example, in FlussigeKristalle in Tabellen II (VEB Deutsche-Verlag fur Grundstoff Industrie, Leipzig) (1984), particularly pp. 7 to 16, and Ekishou Binran (Liquid Crystal Bulletin) edited by Liquid Crystal Bulletin Edition Committee (2000) (Maruzen), particularly chapter 3. Examples of chemical structures of mesogen structures include the chemical structures described in paragraph [0086] to [0090] of Japanese Patent Application Laid-open (JP-A) No. 2007-279688. The mesogen structure is preferably an atomic group that contributes to formation of a cholesteric phase.

The mesogen structure preferably includes a cyclic structure from the viewpoint of forming a liquid crystal phase. The cyclic structure may be a monocycle or a condensed cycle. The cyclic structure may be a cyclic structure having aromaticity or a cyclic structure not having aromaticity. The mesogen group more preferably includes a cyclic structure having aromaticity. The cyclic structure may include a heterocycle. Examples of the atomic group including a cyclic structure include an aromatic hydrocarbon group and an alicyclic hydrocarbon group. The mesogen group may include one kind of cyclic structure or may include two or more kinds of cyclic structures. The mesogen structure may include two or more cyclic structures of the same kind.

The mesogen structure preferably includes at least one aromatic hydrocarbon group, and more preferably includes at least two aromatic hydrocarbon groups, from the viewpoint of haze reduction and dispersion stability. The aromatic hydrocarbon group is preferably an aromatic hydrocarbon group having from 6 to 10 carbon atoms, more preferably an aromatic hydrocarbon group having from 6 to 8 carbon atoms, and particularly preferably a phenylene group, from the viewpoint of forming a liquid crystal phase. A hydrogen atom in the aromatic hydrocarbon group (such as a phenylene group) may be replaced with a substituent. The substituent is, for example, an alkyl group. The alkyl group is, for example, a methyl group. From the viewpoint of forming a liquid crystal phase, the number of aromatic hydrocarbon groups in the mesogen structure is preferably from 2 to 8, more preferably from 3 to 6, and particularly preferably from 3 to 5.

When the mesogen structure includes plural aromatic hydrocarbon groups, any two adjacent aromatic hydrocarbon groups may be connected via a single bond or a connecting group. Examples of the connecting group include —CO—O— and —C—O—. The connecting group is preferably —CO—O— from the viewpoint of reduction of haze and dispersion stability. It is also preferable that the mesogen structure includes at least two aromatic hydrocarbon groups that are connected via at least one kind selected from the group consisting of a single bond and —CO—O—. The mesogen structure preferably includes at least two aromatic hydrocarbon groups that are connected via —CO—O—.

Specific examples of the mesogen structure include a biphenyl structure, a phenyl benzoate structure, a cyclohexyl benzoate structure, an azobenzene structure, a stilbene structure, a terphenyl structure, an anthracene structure, derivatives thereof, and structures formed by connecting two or more of these mesogen structures via a connecting group.

Among them, the mesogen structure is preferably a biphenyl structure or a phenyl benzoate structure, and more preferably a phenyl benzoate structure, from the viewpoint of reduction of haze and dispersion stability.

The polymer compound represented by Formula (1) is preferably a polymer compound having liquid crystallinity from the viewpoint of reduction of haze and dispersion stability. It is surmised that the presence of mesogen structures results in mutual aligning of the mesogen structures, thereby exhibiting liquid crystallinity.

Here, "liquid crystallinity" refers to thermotropic liquid crystallinity or lyotropic liquid crystallinity. In the case of thermotropic liquid crystallinity, this means that there is at least one intermediate phase between the crystal phase and the isotropic phase in a temperature-increasing or temperature-decreasing process. In the case of lyotropic liquid crystallinity, this means that a phase separation state with a certain self-organization force is present in water or in an organic solvent.

Further, $A^1$ in Formula (1) represents a monovalent group having at least one kind of group selected from the group consisting of an acid group, a urea group, a urethane group, a group having a coordinating oxygen atom, a group having a basic nitrogen atom, a phenol group, an alkyl group, an aryl group, a group having an alkyleneoxy chain, an imide group, an alkyloxycarbonyl group, an alkylaminocarbonyl group, a carboxylic acid salt group, a sulfonamide group, a heterocyclic group, an alkoxysilyl group, an epoxy group, an isocyanate group, and a hydroxy group.

The moiety having the ability to adsorb on the particles having a refractive index of 1.8 or more (the foregoing functional group and structure in $A^1$) is hereinafter generally referred to as "adsorptive moiety", as appropriate, in explanations.

The presence of at least adsorptive moiety in one $A^1$ is sufficient, and there may be two or more adsorptive moieties in one $A^1$.

An aspect in which two or more adsorptive moieties are present in one $A^1$ is, for example, an aspect in which two or more adsorptive moieties are connected to form a monovalent substituent $A^1$ via a chain saturated hydrocarbon group (which may be linear or branched, and preferably has from 1 to 10 carbon atoms), a cyclic saturated hydrocarbon group (preferably having from 3 to 10 carbon atoms), an aromatic group (preferably having from 5 to 10 carbon atoms, e.g., a phenylene group), or the like. An aspect in which two or ore adsorptive moieties are connected, via a chain saturated hydrocarbon group, to form a monovalent substituent $A^1$ is preferable.

When the adsorptive moiety by itself configures a monovalent substituent, the adsorptive moiety per se may be the monovalent substituent represented by $A^1$.

The adsorptive moiety in $A^1$ is discussed below.

Examples of the "acid group" described above preferably include a carboxylic acid group, a sulfonic acid group, a monosulfuric ester group, a phosphoric acid group, a monophosphoric ester group, a phosphonic acid group, a phosphinic acid group, and a boric acid group, and more preferably include a carboxylic acid group, a sulfonic acid group, a monosulfuric ester group, a phosphoric acid group, a monophosphoric ester group, a phosphonic acid group, and a phosphinic acid group, still more preferably include a carboxylic acid group, a sulfonic acid group, a phosphoric acid group, a phosphonic acid group, and a phosphinic acid group, and particularly preferably include a carboxylic acid group.

A preferable example of the "urea group" described above is $—NR^{15}CONR^{16}R^{17}$ (in which each of $R^1$, $R^{16}$, and $R^{17}$ independently represents a hydrogen atom, an alkyl group having from 1 to 20 carbon atoms, an aryl group having 6 or more carbon atoms, or an aralkyl group having 7 or more carbon atoms); $—NR^{15}CONHR^{17}$ (in which $R^{15}$ and $R^{17}$ each independently represent a hydrogen atom, an alkyl group having from 1 to 10 carbon atoms, an aryl group having 6 or more carbon atoms, or an aralkyl group having 7 or more carbon atoms) is more preferable, and $—NHCONHR^{17}$ (in which $R^{17}$ represents a hydrogen atom, an alkyl group having from 1 to 10 carbon atoms, an aryl group having 6 or more carbon atoms, or an aralkyl group having 7 or more carbon atoms) is particularly preferable.

Preferable examples of the "urethane group" described above include $—NHCOOR^{18}$, $—NR^{19}COOR^{20}$, $—OCONHR^{21}$, and $—OCONR^{22}R^{23}$ (in which each of $R^{18}$, $R^{19}$, $R^{20}$, $R^{21}$, $R^{22}$, and $R^{23}$ independently represents an alkyl group having from 1 to 20 carbon atoms, an aryl group having 6 or more carbon atoms, or an aralkyl group having 7 or more carbon atoms); $—NHCOOR^{18}$, $—OCONHR^{21}$, and the like (in which each of $R^{11}$ and $R^{21}$ independently represents an alkyl group having from 1 to 20 carbon atoms, an aryl group having 6 or more carbon atoms, or an aralkyl group having 7 or more carbon atoms) are more preferable, and $—NHCOOR^{18}$, $—OCONHR^{21}$, and the like (in which each of $R^{18}$ and $R^{21}$ independently represents an alkyl group having from 1 to 10 carbon atoms, an aryl group having 6 or more carbon atoms, or an aralkyl group having 7 or more carbon atoms) are particularly preferable.

Examples of the "group having a coordinating oxygen atom" include an acetylacetonato group and crown ether.

Preferable examples of the "group having a basic nitrogen atom" include an amino group ($—NH_2$), a substituted imino group ($—NHR^8$ or $—NR^9R^{10}$, in which each of $R^8$, $R^9$, and $R^{10}$ independently represents an alkyl group having from 1 to 20 carbon atoms, an aryl group having 6 or more carbon atoms, or an aralkyl group having 7 or more carbon atoms), a guanidyl group represented by the following Formula (a1), and an amidinyl group represented by the following Formula (a2).

(a1)

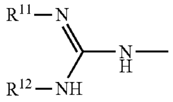

(a2)

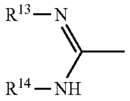

In Formula (a1), each of $R^{11}$ and $R^{12}$ independently represents an alkyl group having from 1 to 20 carbon atoms, an aryl group having 6 or more carbon atoms, or an aralkyl group having 7 or more carbon atoms.

In Formula (a2), each of $R^{13}$ and $R^{14}$ independently represents an alkyl group having from 1 to 20 carbon atoms, an aryl group having 6 or more carbon atoms, or an aralkyl group having 7 or more carbon atoms.

Among them, an amino group ($—NH_2$), a substituted imino group ($—NHR^8$ or $—NR^9R^{10}$, in which each of $R^8$, $R^9$, and $R^{10}$ independently represents an alkyl group having from 1 to 10 carbon atoms, a phenyl group, or a benzyl group), a guanidyl group represented by Formula (a1) [wherein, in Formula (a1), each of $R^{11}$ and $R^{12}$ independently represents an alkyl group having from 1 to 10 carbon atoms, a phenyl group, or a benzyl group], an amidinyl group represented by Formula (a2) [wherein, in Formula (a2), each of $R^{13}$ and $R^{14}$ independently represents an alkyl group having from 1 to 10 carbon atoms, a phenyl group, or a benzyl group], and the like are more preferable.

In particular, an amino group ($—NH_2$), a substituted imino group ($—NHR^8$ or $—NR^9R^{10}$, in which each of $R^8$, $R^9$, and $R^{10}$ independently represents an alkyl group having from 1 to 5 carbon atoms, a phenyl group, or a benzyl group), a guanidyl group represented by Formula (a1) [wherein, in Formula (a1), each of $R^{11}$ and $R^{12}$ independently represents an alkyl group having from 1 to 5 carbon atoms, a phenyl group, or a benzyl group], an amidinyl group represented by Formula (a2) [wherein, in Formula (a2), each of $R^{13}$ and $R^{14}$ independently represents an alkyl group having from 1 to 5 carbon atoms, a phenyl group, or a benzyl group], and the like are preferably used.

The alkyl group as the monovalent substituent $A^1$ may be linear or branched, and is preferably an alkyl group having from 1 to 40 carbon atoms, more preferably an alkyl group having from 1 to 30 carbon atoms, still more preferably an alkyl group having from 1 to 18 carbon atoms, and most preferably an alkyl group having from 1 to 12 carbon atoms.

The aryl group as the monovalent substituent $A^1$ is preferably an aryl group having from 6 to 10 carbon atoms.

The "group having an alkyleneoxy chain" described above is preferably a group in which a terminal thereof forms an alkyleneoxy group, and more preferably a group in which a terminal thereof forms an alkyleneoxy group having from 1 to 20 carbon atoms. The alkyleneoxy chain is not particularly limited as long as it has at least one alkyleneoxy group, and the alkyleneoxy chain is preferably formed from 1 to 6 alkyleneoxy groups. Examples of the alkyleneoxy group include $—CH_2CH_2O—$ and $—CH_2CH_2CH_2O—$.

The alkyl group moiety in the "alkyloxycarbonyl group" is preferably an alkyl group having from 1 to 20 carbon atoms.

The alkyl group moiety in the "alkylaminocarbonyl group" described above is preferably an alkyl group having from 1 to 20 carbon atoms.

The "carboxylic acid salt group" described above is, for example, a group formed of an ammonium salt of a carboxylic acid.

In the "sulfonamide group" described above, the hydrogen atom bonded to the nitrogen atom may be replaced with an alkyl group (for example, a methyl group), an acyl group (for example, an acetyl group or a trifluoroacetyl group), or the like.

Preferable examples of the heterocycle in the "heterocyclic structure" described above include thiophene, furan, xanthene, pyrrole, pyrroline, pyrrolidine, dioxolane, pyrazole, pyrazoline, pyrazolidine, imidazole, oxazole, thiazole, oxadiazole, triazole, thiadiazole, pyrane, pyridine, piperidine, dioxane, morpholine, pyridazine, pyrimidine, piperazine, triazine, trithiane, isoindoline, isoindolinone, benzimidazolone, benzothiazole, hydantoin, indole, quinoline, carbazole, acridine, acridone, and anthraquinone.

Examples of the "imide group" include a succinimide group, a phthalimide group, and a naphthalimide group.

The "heterocyclic structure" and the "imide group" may further have a substituent, and examples of the substituent include: a $C_1$-$C_{20}$ alkyl group such as a methyl group or an ethyl group; a $C_6$-$C_{16}$ aryl group such as a phenyl group or a naphthyl group; a hydroxy group; an amino group; a carboxyl group; a sulfonamide group; a N-sulfonylamide group; a $C_1$-$C_6$ acyloxy group such as an acetoxy group; a $C_1$-$C_{20}$ alkoxy group such as a methoxy group or an ethoxy group; a halogen atom such as chlorine or bromine; a $C_2$-$C_7$ alkoxycarbonyl group such as a methoxycarbonyl group, an ethoxycarbonyl group, or a cyclohexyloxycarbonyl group; a cyano group; and a carbonic ester group such as t-butyl carbonate.

The "alkoxysilyl group" described above may be any of a monoalkoxysilyl group, a dialkoxysilyl group, or a trialkoxysilyl group, and the alkoxysilyl group is preferably a trialkoxysilyl group, such as a trimethoxysilyl group or a triethoxysilyl group.

Examples of the "epoxy group" described above include a substituted or unsubstituted oxirane group (an ethylene oxide group).

$A^1$ is preferably a monovalent group having a functional group with a pKa of 5 or less, more preferably a monovalent group having a functional group with a pKa of 4.6 or less, and particularly preferably a monovalent group having a functional group with a pKa of 4.4 or less, from the viewpoint of dispersion stability and reduction of haze.

From the viewpoint of dispersion stability and reduction of haze, at least one of n $A_1$'s is preferably a monovalent group having an acid group, and more preferably a monovalent group having a carboxylic acid group. It is more preferable that n $A_1$'s are monovalent groups each having an acid group, most preferably monovalent groups each having a carboxylic acid group. As the monovalent group having a carboxylic acid group, $C_1$-$C_{12}$ alkyl group having from 1 to 3 carboxylic acid groups, or a $C_6$-$C_{12}$ aryl group having from 1 to 3 carboxylic acid groups is preferable.

As the alkyl moiety in the $C_1$-$C_{12}$ alkyl group having from 1 to 3 carboxylic acid groups, methyl, ethyl, propyl, and butyl are preferable. Among them, a monovalent group which is derived from succinic acid and in which two hydrogen atoms of the ethyl group have been replaced with two carboxy groups is preferable as the $C_1$-$C_{12}$ alkyl group having from 1 to 3 carboxylic acid groups.

As the aryl moiety in the $C_6$-$C_{12}$ aryl group having from 1 to 3 carboxylic acid groups, phenyl, naphthyl, and diphenyl are preferable, and phenyl is more preferable. The $C_6$-$C_{12}$ aryl group having from 1 to 3 carboxylic acid groups may include a connecting group between the aryl group and a carboxylic acid group. As the connecting group, an alkylene group is preferable, a methylene group or an ethylene group is more preferable, and a methylene group is still more preferable. The $C_6$-$C_{12}$ aryl group having from 1 to 3 carboxylic acid groups is preferably a monovalent group which is derived from benzoic acid and in which one hydrogen atom of a phenyl group has been replaced with one carboxy group, or a monovalent group derived from phenylacetic acid and in which one hydrogen atom of a phenyl group has been replaced with a methylene group connected to a carboxy group, and is most preferably a monovalent group which is derived from benzoic acid and in which one hydrogen atom of a phenyl group has been replaced with one carboxy group.

In Formula (1), $R^2$ represents a single bond or a divalent connecting group. $R^2$'s, n in number, may be the same or different.

The divalent connecting group represented by $R^2$ may be a group formed from 1 to 100 carbon atoms, from 0 to 10 nitrogen atoms, from 0 to 50 oxygen atoms, from 1 to 200 hydrogen atoms, and from 0 to 20 sulfur atoms, which may be unsubstituted or may further have a substituent.

From the viewpoint of dispersion stability and reduction of haze, $R^2$ is preferably a divalent connecting group formed from 1 to 30 carbon atoms, from 0 to 10 oxygen atoms, from 1 to 60 hydrogen atoms, and from 0 to 20 sulfur atoms, and more preferably a divalent connecting group formed from 1 to 30 carbon atoms, from 0 to 10 oxygen atoms, from 1 to 60 hydrogen atoms, and from 1 to 20 sulfur atoms.

$R^2$ is preferably a group selected from the group consisting of a chain saturated hydrocarbon group (which may be linear or branched, and preferably has from 1 to 20 carbon atoms), a cyclic saturated hydrocarbon group (which preferably has from 3 to 20 carbon atoms), an aromatic group (which preferably has from 5 to 20 carbon atoms, such as a phenylene group), a thioether bond, an ester bond, an amide bond, an ether bond, a nitrogen atom, and a carbonyl group, or a group obtained by combining two or more of these, more preferably a group selected from the group consisting of a chain saturated hydrocarbon group, a cyclic saturated hydrocarbon group, an aromatic group, a thioether bond, an ester bond, an ether bond, and an amide bond, or a group obtained by combining two or more thereof, and particularly preferably a group selected from the group consisting of a chain saturated hydrocarbon group, a thioether bond, an ester bond, an ether bond, and an amide bond, or a group obtained by combining two or more thereof.

When the divalent connecting group represented by $R^2$ has a substituent, examples of the substituent include: a $C_1$-$C_{20}$ alkyl group such as a methyl group or an ethyl group; a $C_6$-$C_{16}$ aryl group such as a phenyl group or a naphthyl group; a hydroxy group; an amino group; a carboxyl group; a sulfonamide group; a N-sulfonylamide group; a $C_1$-$C_6$ acyloxy group such as an acetoxy group; a $C_1$-$C_6$ alkoxy group such as a methoxy group or an ethoxy group; a halogen atom such as chlorine or bromine; a $C_2$-$C_7$ alkoxycarbonyl group such as a methoxycarbonyl group, an ethoxycarbonyl group, or a cyclohexyloxycarbonyl group; a cyano group; and a carbonic ester group such as t-butyl carbonate.

In Formula (1), $R^1$ represents an (m+n)-valent connecting group, and m+n is from 2 to 10; m+n is preferably from 3 to 6, and m is preferably 6.

The (m+n)-valent connecting group represented by $R^1$ is, for example, a group formed from 1 to 100 carbon atoms, from 0 to 10 nitrogen atoms, from 0 to 50 oxygen atoms, from 1 to 200 hydrogen atoms, and from 0 to 20 sulfur atoms, which may be unsubstituted or may further have a substituent.

The (m+n)-valent connecting group represented by $R^1$ is preferably a group of any one of the following type T-3 to type T-6 represented by the following general formulae, and a group of type T-6 is most preferable.

Type T-3

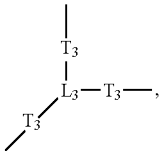

-continued

Type T-4

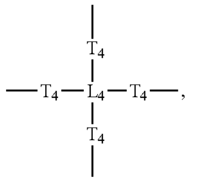

Type T-5

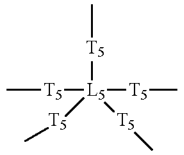

or

Type T-6

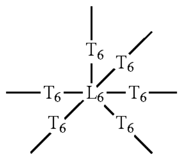

In the above formulae:

$L_3$ represents a trivalent group, $T_3$ represents a single bond or a divalent connecting group, and three $T_3$'s may be the same as each other or different from each other;

$L_4$ represents a tetravalent group, $T_4$ represents a single bond or a divalent connecting group, and four $T_4$'s may be the same as each other or different from each other;

$L_5$ represents a pentavalent group, $T_5$ represents a single bond or a divalent connecting group, and five $T_5$'s may be the same as each other or different from each other; and $L_6$ represents a hexavalent group, $T_6$ represents a single bond or a divalent connecting group, and six $T_6$'s may be the same as each other or different from each other.

Specific examples of the (m+n)-valent connecting group represented by $R^1$ [Specific Examples (1) to (17)] are shown below. However, the specific examples are not limited thereto in the present disclosure.

(1)

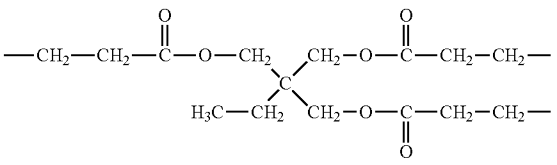

(2)

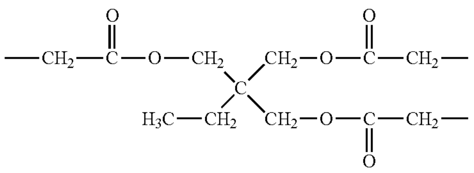

(3)

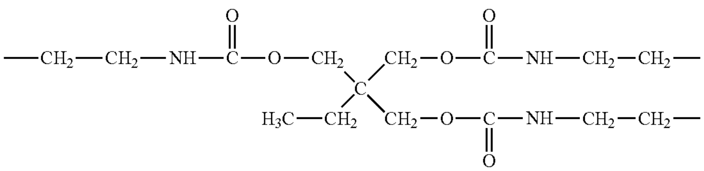

-continued
(4)
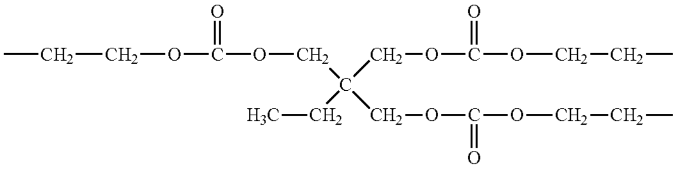
(5)
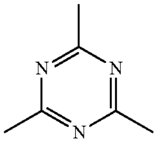
(6)
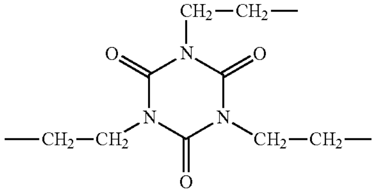
(7)
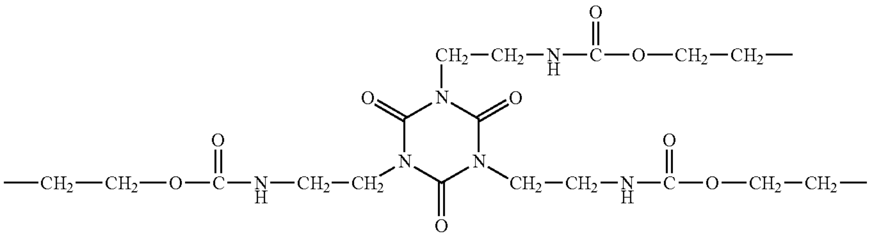
(8)
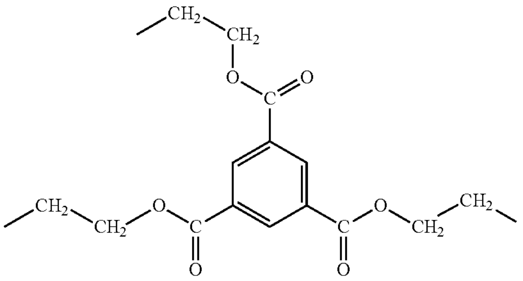
(9)
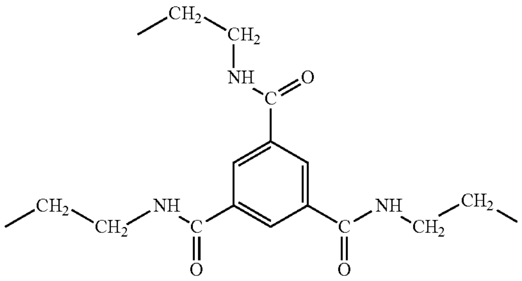
(10)
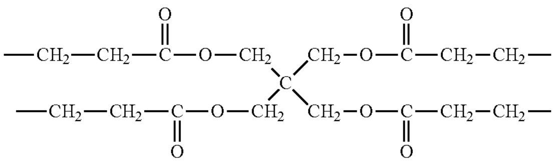
(11)
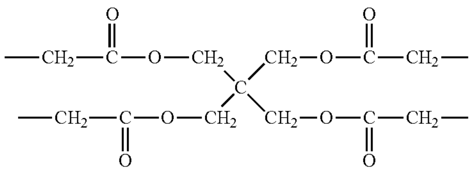
(12)
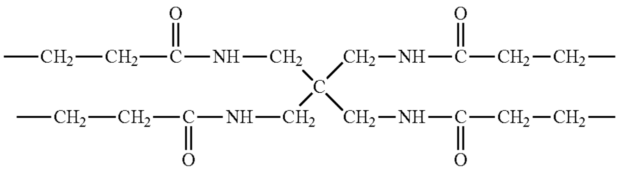
(13)
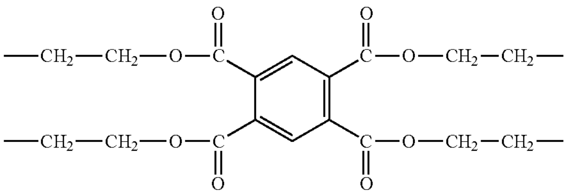
(14)
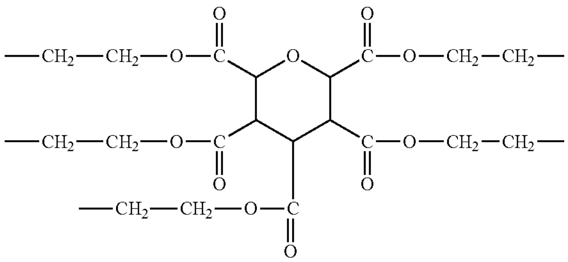

-continued
(15)
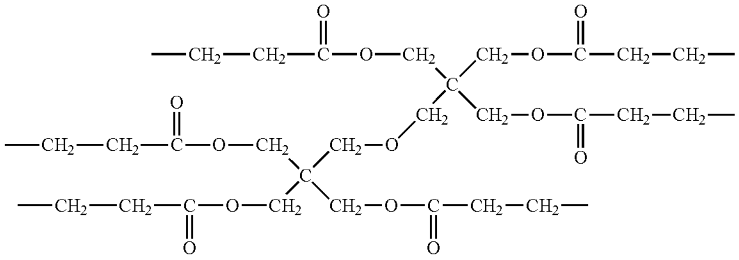
(16)
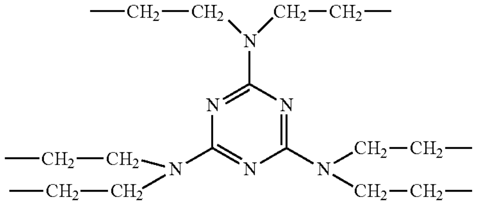
(17)
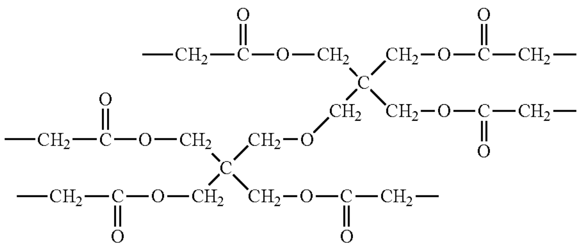
Among the above specific examples, most preferable (m+n)-valent connecting groups are groups (1), (2), (10), (11), (16) and (17) shown below, from the viewpoint of availability of ingredients, ease of synthesis, and solubility in various solvents.
(1)
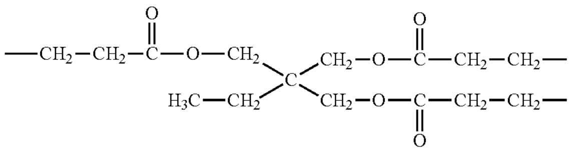
(2)
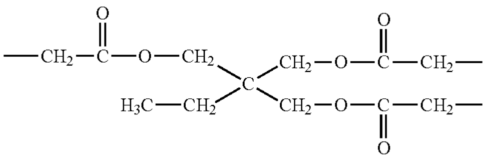
(10)
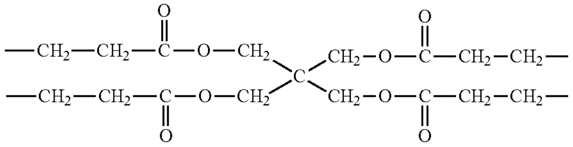
(11)
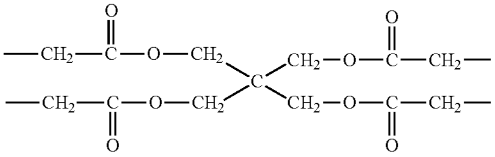
(16)
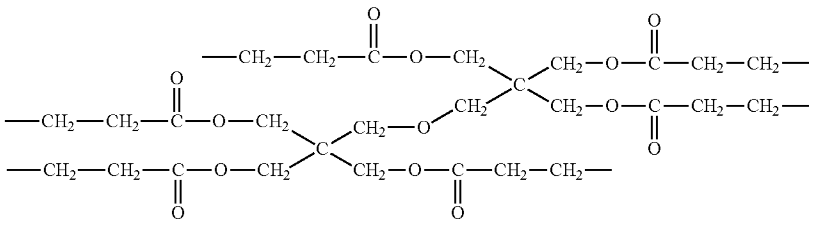
(17)
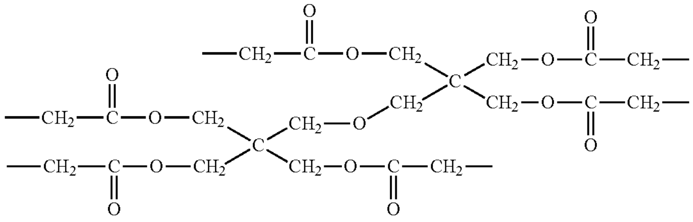

In Formula (1), m represents a positive number of 8 or less; m is preferably from 0.5 to 5, more preferably from 1 to 4, and particularly preferably from 1 to 3, from the viewpoint of dispersion stability and reduction of haze.

In Formula (1), n represents from 1 to 9; n is preferably from 2 to 8, more preferably from 2 to 7, and particularly preferably from 3 to 6 from the viewpoint of dispersion stability and reduction of haze.

In Formula (1), $P^1$ represents a polymer chain, which may be selected from known polymers and the like, in accordance with purpose; m $P^1$'s may be the same or different.

Further, $P^1$ preferably has a mesogen structure from the viewpoint of dispersion stability and reduction of haze.

Among the polymers, for forming a polymer chain, at least one kind selected from the group consisting of a polymer or copolymer of a vinyl monomer, an ester-based polymer, an ether-based polymer, a urethane-based polymer, an amide-based polymer, an epoxy-based polymer, a silicone-based polymer, and modified products or copolymers thereof [including, for example, a polyether/polyurethane copolymer and a copolymer of polyether and a polymer of a vinyl monomer (which may be any of a random copolymer, a block copolymer, or a graft copolymer)] is preferable, at least one kind selected from the group consisting of a polymer or copolymer of a vinyl monomer, an ester-based polymer, an ether-based polymer, a urethane-based polymer, and modified products or copolymers thereof is more preferable, and a polymer or copolymer of a vinyl polymer is particularly preferable.

The polymer or copolymer of a vinyl polymer, the ester-based polymer, or the ether-based polymer that the polymer chain $P^1$ may include preferably includes a structure represented by the following Formula (L), Formula (M), or Formula (N), respectively.

(L)

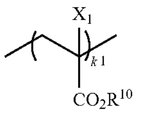

(M)

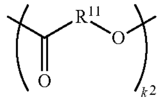

(N)

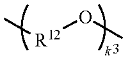

In the above formulae:

$X^1$ represents a hydrogen atom or a monovalent organic group, and, from the viewpoint of restrictions in synthesis, $X^1$ represents preferably a hydrogen atom or an alkyl group having from 1 to 12 carbon atoms, more preferably a hydrogen atom or a methyl group, and particularly preferably a methyl group;

$R^{10}$ represents a hydrogen atom or a monovalent organic group, wherein although the structure thereof is not particularly limited, $R^{10}$ represents preferably a hydrogen atom, an alkyl group, an aryl group, or a heteroaryl group, more preferably a hydrogen atom or an alkyl group, and wherein when $R^{10}$ is an alkyl group, the alkyl group is preferably a linear alkyl group having from 1 to 20 carbon atoms, a branched alkyl group having from 3 to 20 carbon atoms, or a cyclic alkyl group having from 5 to 20 carbon atoms, more preferably a linear alkyl group having from 1 to 20 carbon atoms, and particularly preferably a linear alkyl group having from 1 to 6 carbon atoms, and wherein two or more types of $R^{10}$ having different structures may be present in Formula (L);

each of $R^{11}$ and $R^{12}$ represents a branched or linear alkylene group (having preferably from 1 to 10 carbon atoms, more preferably from 2 to 8 carbon atoms, and still more preferably 3 to 6 carbon atoms), and two or more types of $R^{11}$ or $R^{12}$ having different structures may be present in each formula; and each of k1, k2, and k3 independently represents a number from 5 to 140.

The polymer chain $P^1$ preferably includes a structural unit having a polyalkyleneoxy group from the viewpoint of dispersion stability and haze reduction.

The number of repetition of alkyleneoxy structure in the polyalkyleneoxy group is preferably from 2 to 60, more preferably from 2 to 30, and particularly preferably from 3 to 10, from the viewpoint of achieving dispersion stability, haze reduction, and high refractive index.

A preferable alkyleneoxy structure is an ethyleneoxy structure or a propyleneoxy structure. The polyalkyleneoxy group may have a structure that includes both of an ethyleneoxy structure and a propyleneoxy structure.

The polymer compound represented by Formula (1) is preferably soluble in an organic solvent. In a case in which the polymer compound has a low affinity with an organic solvent, the affinity with the dispersion medium is reduced, and there are cases in which an adsorption amount that is sufficient for providing dispersion stability is not obtained.

The vinyl monomer described above is not particularly limited. The vinyl monomer is preferably, for example, a (meth)acrylic ester, a crotonic ester, a vinyl ester, a vinyl monomer having an acid group, a maleic diester, a furmaric diester, an itaconic diester, a (meth)acrylamide, a styrene, a vinyl ether, a vinyl ketone, an olefin, a maleimide, or (meth)acrylonitrile, more preferably a (meth)acrylic ester, a crotonic ester, a vinyl ester, or a vinyl monomer having an acid group, and still more preferably a (meth)acrylic ester or a crotonic ester.

Preferable examples of these vinyl monomers include the vinyl monomers described in Japanese Patent Application Laid-open (JP-A) No. 2007-277514, paragraphs [0089] to [0094], [0096] and [0097](paragraphs [0105] to [0117] and [0119] to [0120] of corresponding US Patent Application Publication No. 2010/233595), the disclosure of which is incorporated herein by reference.

In addition to the above compounds, vinyl monomers having a functional group such as a urethane group, a urea group, a sulfonamide group, a phenol group, or an imide group are also usable, for example. Monomers having a urethane group or a urea group can be appropriately synthesized, for example, by utilizing an addition reaction between an isocyanate group and a hydroxy or amino group. Specifically, the monomers can be synthesized, as appropriate, by, for example, an addition reaction between an isocyanate group-containing monomer and a compound having one hydroxy group or compound having one primary or secondary amino group, or an addition reaction between a hydroxy group-containing monomer or primary or secondary amino group-containing monomer and a monoisocyanate.

Among the polymer compounds represented by Formula (1), polymer compounds represented by the following Formula (2) are preferable.

$$(A^2—R^4—S)_n—R^3—(S—R^5—P^2)_m \quad (2)$$

In Formula (2), $A^2$ has the same definition as $A^1$ in Formula (1), and preferable aspects thereof are also the same.

In Formula (2), each of $R^4$ and $R^5$ independently represents a single bond or a divalent connecting group; n $R^4$'s may be the same or different, and m $R^5$'s may be the same or different.

A divalent connecting group exemplified as the above-described divalent connecting group that can be represented by $R^2$ in Formula (1) may be used as the divalent connecting group that can be represented by $R^4$ or $R^5$, and preferable aspects thereof are also the same.

Among them, the connecting group represented by $R^4$ or $R^5$ is preferably a group selected from the group consisting of a chain saturated hydrocarbon group (which may be linear or branched, and preferably has from 1 to 20 carbon atoms), a cyclic saturated hydrocarbon group (preferably having from 3 to 20 carbon atoms), an aromatic group (preferably having from 5 to 20 carbon atoms, e.g., a phenylene group), an ester bond, an amide bond, an ether bond, a nitrogen atom, and a carbonyl group, or a group obtained by combining two or more of these, preferably a group selected from the group consisting of a chain saturated hydrocarbon group, a cyclic saturated hydrocarbon group, an aromatic group, an ester bond, an ether bond, and an amide bond, or a group obtained by combining two or more thereof, and still more preferably a group selected from the group consisting of a chain saturated hydrocarbon group, an ester bond, an ether bond, and an amide bond, or a group obtained by combining two or more thereof.

In Formula (2), $R^3$ represents an (m+n)-valent connecting group, and m+n is from 2 to 10.

The (m+n)-valent connecting group represented by $R^3$ may be unsubstituted or may have a substituent. As the (m+n)-valent connecting group represented by $R^3$, the (m+n)-valent connecting groups exemplified as the above-described (m+n)-valent connecting group represented by $R^1$ in Formula (1) may be used, and preferable aspects thereof are also the same.

In Formula (2), each of m and n has the same definitions as those of m and n in Formula (1), and preferable examples are also the same.

Further $P^2$ in Formula (2) has the same definition as that of $P^1$ in Formula (1), and preferable aspects are also the same. Here, m $P^2$'s may be the same or different.

Among the polymer compounds that can be represented by Formula (2), those in which all of $R^3$, $R^4$, $R^5$, $P^2$, m, and n are as described below are preferable:

$R^3$ is as shown in specific example (1), (2), (10), (11), (16), or (17) presented above;

$R^4$ is a single bond, or a group selected from the group consisting of a chain saturated hydrocarbon group, a cyclic saturated hydrocarbon group, an aromatic group, an ester bond, an amide bond, an ether bond, a nitrogen atom, and a carbonyl group, or a group obtained by combining two or more of these;

$R^5$ is a single bond, an ethylene group, a propylene group, the following group (a), or the following group (b), wherein, in the groups shown below, $R^{12}$ represents a hydrogen atom or a methyl group, and l represents 1 or 2;

(a)

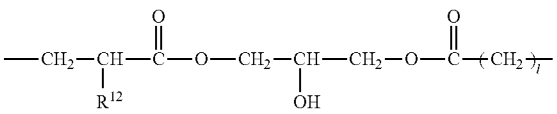

(b)

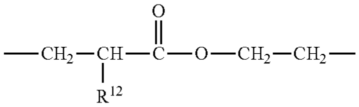

$P^2$ is a polymer or copolymer of a vinyl monomer, an ester-based polymer, an ether-based polymer, a urethane-based polymer, or a modified product thereof;

m is from 1 to 3; and n is from 3 to 6.

The acid value of the polymer compound represented by Formula (1) is preferably less than 150 mgKOH/g, more preferably less than 100 mgKOH/g, and still more preferably 60 mgKOH/g or less, from the viewpoint of dispersion stability. By setting the acid value to be within the foregoing range, aggregation of the polymer compound represented by Formula (1) due to acid groups can be prevented, and phase separation between the particles having a refractive index of 1.8 or more and the polymer compound represented by Formula (1) can be prevented, as a result of which a favorable coating surface state can be obtained.

The lower limit of the acid value is not particularly limited, and the acid value is preferably 2 mgKOH/g or more, and more preferably 5 mgKOH/g or more, from the viewpoint of dispersion stability of the metal oxide particles.

The acid value of the polymer compound represented by Formula (1) in the present disclosure is the acid value of solids of the polymer compound.

The acid value of the polymer compound can be calculated, for example, from the average content of acid groups in the polymer compound. The acid value of the polymer compound can be adjusted by adjusting the amount of acid groups of the polymer compound, as appropriate. For example, a polymer compound having a desired acid value can be synthesized by appropriately adjusting, in the synthesis of the polymer compound, the amount of a compound having an acid group and a carbon-carbon double bond or a vinyl monomer having an acid group that serves as a raw material.

The weight average molecular weight (Mw) of the polymer compound represented by Formula (1) is preferably from 1,000 to 50,000, more preferably from 2,000 to 30,000, and particularly preferably from 3,000 to 10,000. When the weight average molecular weight is within the above range, the effect produced by the plural adsorptive moieties that have been introduced at terminals of the polymer is sufficiently exerted, and excellent performance in terms of adsorption on the surfaces of the particles having a refractive index of 1.8 or more can be exerted.

—Method of Synthesizing Polymer Compound—

The synthesis of the polymer compound represented by Formula (1) or Formula (2) is not particularly limited, and the polymer compound represented by Formula (1) or Formula (2) can be synthesized according to the synthesis methods described in paragraphs [0114] to [0140] and [0266] to [0348] of Japanese Patent Application Laid-open (JP-A) No. 2007-277514 and paragraphs [0077] to [0108] of Japanese Patent Application Laid-open (JP-A) No. 2014-177613.

As a raw material, a monomer having a mesogen structure such as those shown below can favorably be used. It should be noted that Me represents a methyl group.

esters, modified polyurethanes, modified polyesters, modified poly(meth)acrylates, (meth)acrylic copolymers, and naphthalenesulfonic acid formalin condensates], and polyoxyethylene alkyl phosphoric esters, polyoxyethylene alkyl amines, alkanol amines, and pigment derivatives.

Other resins can be classified into linear polymers, terminal-modified polymers, graft polymers, and block polymers, based on the structures thereof.

Specific examples of other resins include DISPERBYK 101 (a polyamideamine phosphoric acid salt), 107 (a carboxylic ester), 110, 180 (copolymers containing an acid group), 130 (a polyamide), 161, 162, 163, 164, 165, 166, and 170 (high-molecular copolymers), and BYK-P104, P105

M-1

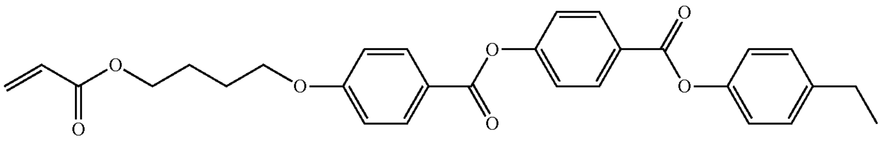

M-2

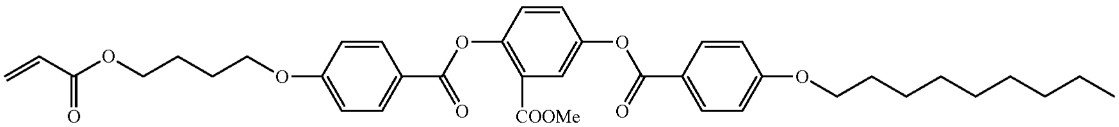

M-3

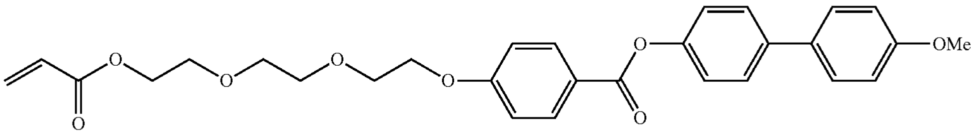

M-4

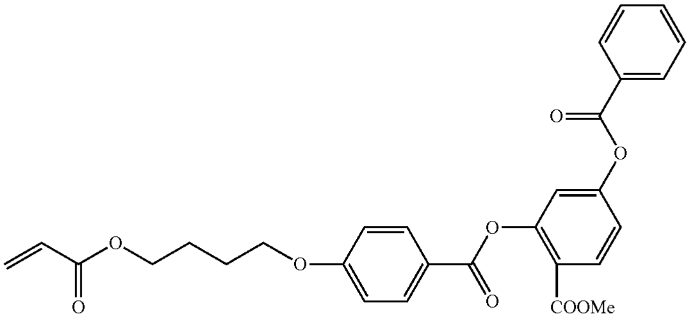

The polymer compound represented by Formula (1) may be used singly, or in combination of two or more thereof.

From the viewpoints of dispersibility, high refractive index, and coating surface state, the content of the polymer compound represented by Formula (1) is preferably in a range of from 5% by mass to 70% by mass, more preferably in a range of from 10% by mass to 60% by mass, and still more preferably in a range of from 15% by mass to 50% by mass, with respect to the total solids content of the composition.

[Other Resins]

The composition according to the present disclosure may further include resins (hereinafter also referred to as "other resins") other than the polymer compound represented by Formula (1), for the purpose of, for example, adjusting the dispersibility of the particles having a refractive index of 1.8 or more.

Examples of other resins include polymer dispersants [for example, polyamideamines and salts thereof, polycarboxylic acids and salts thereof, high-molecular-weight unsaturated (high molecular unsaturated polycarboxylic acids), which are manufactured by BYK Chemie; EFKA 4047, 4050, 4010, 4165 (polyurethane-based), EFKA 4330, 4340 (block copolymers), 4400, 4402 (modified polyacrylates), 5010 (a polyester amide), 5765 (a high molecular polycarboxylic acid salt), 6220 (a fatty acid polyester), 6745 (a phthalocyanine derivative), and 6750 (an azo pigment derivative), which are manufactured by EFKA; AJISPER PB821 and PB822, which are manufactured by Ajinomoto Fine-Techno Co., Inc.; FLOWLEN TG-710 (a urethane oligomer), and POLYFLOW No. 50E and No. 300 (acrylic copolymers), which are manufactured by Kyoeisha Chemical Co., Ltd.; DISPARLON KS-860, 873SN, 874, #2150 (aliphatic polyfunctional carboxylic acids), #7004 (a polyether ester), DA-703-50, DA-705, and DA-725, which are manufactured by Kusumoto Chemicals, Ltd.; DEMOL RN, N (naphthalenesulfonic acid formalin polycondensates), MS, C, SN-B (aromatic sulfonic acid formalin polycondensates), HOMOGENOL L-18 (a high-molecular polycarboxylic acid), EMULGEN 920, 930, 935, 985 (polyoxyethylene nonyl phenyl ethers), and ACETAMIN 86 (a stearylamine acetate), which are manufactured by Kao Corporation; SOLSPERSE 5000 (a phthalocyanine derivative), 22000 (an azo pigment derivative), 13240 (a polyester amine), 3000, 17000, 27000 (polymers having a functional portion at a terminal), 24000, 28000, 32000, and 38500 (graft polymers), which are manufactured by The Lubrizol Corporation; and NIKKOL T106 (a polyoxyethylene sorbitan monooleate) and MYS-IEX (a polyoxyethylene monostearate), which are manufactured by Nikko Chemicals Co, Ltd.

Further examples of other resins include polymers obtained by polymerization using the compounds represented by Formula (ED) described in paragraph [0562] and subsequent paragraphs of Japanese Patent Application Laid-open (JP-A) No. 2012-208494 (paragraph [0692] and subsequent paragraphs of corresponding U.S. Patent Application Publication No. 2012/235099) (also referred to as ether dimers) as essential monomer components, and the disclosures of these patent documents are herein incorporated by reference.

With respect to specific examples of ether dimers, the description of ether dimers in paragraph [0565] of Japanese Patent Application Laid-open (JP-A) No. 2012-208494 (paragraph [0694] of corresponding U.S. Patent Application Publication No. 2012/235099) can be referenced, and the contents of the descriptions are incorporated herein.

From among these other resins, only a single resin may be used, or two or more resins may be used in combination.

The composition according to the present disclosure may include other resins or may be free of other resins. When the composition includes other resins, the content of other resins in the composition according to the present disclosure is preferably smaller than the content of the polymer compound represented by Formula (1).

[Solvent]

The composition according to the present disclosure includes a solvent, and a variety of organic solvents may be used to configure the solvent.

Organic solvents that can be used include acetone, methyl ethyl ketone, cyclohexane, ethyl acetate, ethylene dichloride, tetrahydrofuran, toluene, ethyleneglycol monomethyl ether, ethyleneglycol monoethyl ether, ethyleneglycol dimethyl ether, propyleneglycol monomethyl ether, propyleneglycol monoethyl ether, acetylacetone, cyclohexanone, diacetone alcohol, ethyleneglycol monomethyl ether acetate, ethyleneglycol ethyl ether acetate, ethyleneglycol monoisopropyl ether, ethyleneglycol monobutyl ether acetate, 3-methoxypropanol, methoxymethoxy ethanol, diethyleneglycol monomethyl ether, diethyleneglycol monoethyl ether, diethyleneglycol dimethyl ether, diethyleneglycol diethyl ether, propyleneglycol monomethyl ether acetate, propyleneglycol monoethyl ether acetate, 3-methoxypropyl acetate, N,N-dimethylformamide, dimethylsulfoxide, γ-butyrolactone, methyl lactate, and ethyl lactate.

From among these organic acids, a single solvent may be used, or a mixture of two or more solvents may be used.

The concentration of solids in the composition according to the present disclosure is preferably from 2% by mass to 90% by mass.

[Liquid Crystal Compound]

The composition according to the present disclosure preferably includes a liquid crystal compound, from the viewpoint of facilitating exertion of the effect according to the present disclosure.

With respect to the type of the liquid crystal compound, for example, the liquid crystal compound may be selected from known compounds that have liquid crystallinity (for example, cholesteric liquid crystal compounds), in accordance with the desired properties of the liquid crystal layer. An example of the liquid crystal compound is a liquid crystal compound that has at least one kind selected from the group consisting of an ethylenic unsaturated group and a cyclic ether group. From the viewpoint of improving moldability, the liquid crystal compound preferably includes a cholesteric liquid crystal compound having one ethylenic unsaturated group or one cyclic ether group (hereinafter also referred to as "specific liquid crystal compound").

Examples of the ethylenic unsaturated group in the specific liquid crystal compound include a (meth)acryloyloxy group, a (meth)acrylamide group, a vinyl group, a vinyl ester group, and a vinyl ether group. From the viewpoint of reactivity, the ethylenic unsaturated group is preferably a (meth)acryloyloxy group, a (meth)acrylamide group, or a vinyl group, more preferably a (meth)acryloyloxy group or a (meth)acrylamide group, still more preferably a (meth) acryloyloxy group, and particularly preferably an acryloyloxy group.

Examples of the cyclic ether group in the specific liquid crystal compound include an epoxy group and an oxetanyl group. From the viewpoint of reactivity, the cyclic ether group is preferably an epoxy group or an oxetanyl group, and more preferably an oxetanyl group.

From the viewpoint of improvement of reactivity and moldability, a liquid crystal compound that has one ethylenic unsaturated group is preferably included as a liquid crystal compound. Further, the proportion of the total amount of liquid crystal compounds having one ethylenic unsaturated group with respect to the total amount of the solids of the composition is preferably 25% by mass or more.

When the number of ethylenic unsaturated groups contained in a molecule is one, the specific liquid crystal compound may further have a functional group (for example, a polymerizable group) other than the ethylenic unsaturated group. For example, a liquid crystal compound having one ethylenic unsaturated group may further have one or more cyclic ether groups.

When the number of cyclic ether groups contained in a molecule is one, the specific liquid crystal compound may further have a functional group (for example, a polymerizable group) other than the cyclic ether group. For example, a liquid crystal compound having one cyclic ether group may further have one ethylenic unsaturated group.

From the viewpoint of improvement of moldability, it is preferable that a liquid crystal compound that has one ethylenic unsaturated group but does not have a cyclic ether group, a liquid crystal compound that has one cyclic ether group but does not have an ethylenic unsaturated group, or a liquid crystal compound that has one ethylenic unsaturated group and one cyclic ether group is contained as a liquid crystal compound. Further, it is preferable that a liquid crystal compound that has one ethylenic unsaturated group but does not have a cyclic ether group is contained as a liquid crystal compound.

The specific liquid crystal compound may be a rod-shaped liquid crystal compound or a disc-shaped liquid crystal compound. A rod-shaped liquid crystal compound is preferable from the viewpoints of facilitating adjustment of the helical pitch in a cholesteric liquid crystal phase and reducing a change in reflectance and a change in tint after shaping.

Preferable rod-shaped liquid crystal compounds include an azomethine-based compound, an azoxy-based compound, a cyanobiphenyl-based compound, a cyanophenyl ester, a benzoic ester, a cyclohexane carboxylic acid phenyl ester, a cyanophenylcyclohexane-based compound, a cyano-substituted phenyl pyrimidine-based compound, an alkoxy-substituted phenyl pyrimidine-based compound, a phenyl dioxane-based compound, a tolan-based compound, and an alkenylcyclohexyl benzonitrile-based compound. Rod-shaped liquid crystal compounds are not limited to low-molecular-weight compounds, and include polymer compounds.

Rod-shaped liquid crystal compounds may be selected from compounds having one ethylenic unsaturated group and compounds having one cyclic ether group disclosed in *Makromol. Chem.*, vol. 190 (1989), p. 2255, *Advanced Materials*, vol. 5 (1993), p. 107, U.S. Pat. Nos. 4,683,327, 5,622,648, and 5,770,107, International Publication (WO) Nos. 95/22586, 95/24455, 97/00600, 98/23580, and 98/52905, Japanese Patent Application Laid-open (JP-A) Nos. H1-272551, H6-16616, H7-110469, H11-80081, and 2001-328973. Preferable rod-shaped liquid crystal compounds may be selected from compounds having one ethylenic unsaturated group and compounds having one cyclic ether group described in Japanese Patent Application Laid-open (JP-A) Nos. H11-513019 and 2007-279688.

Preferable disc-shaped liquid crystal compounds may be selected from compounds having one ethylenic unsaturated group and compounds having one cyclic ether group described in Japanese Patent Application Laid-open (JP-A) Nos. 2007-108732 and 2010-244038.

Specific examples of the specific liquid crystal compounds are shown below. However, the specific liquid crystal compounds are not limited to the following specific examples.

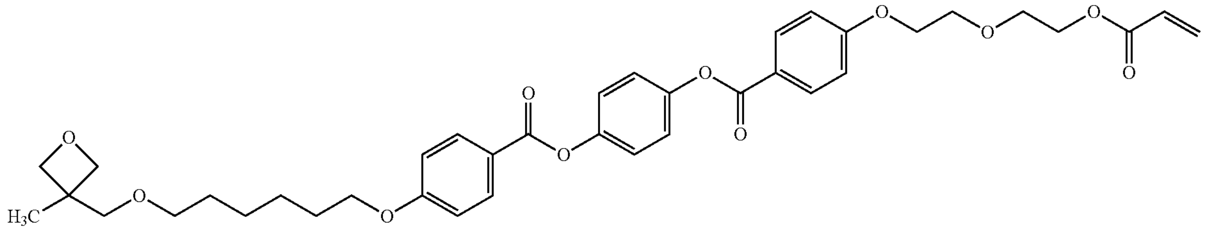

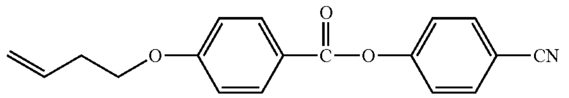

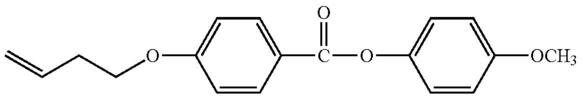

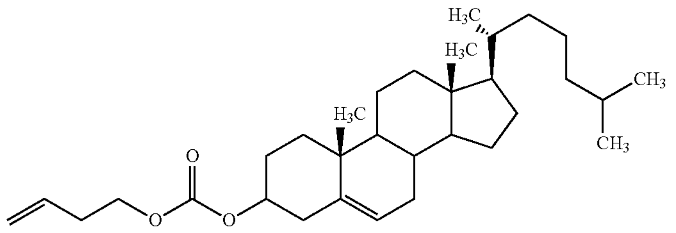

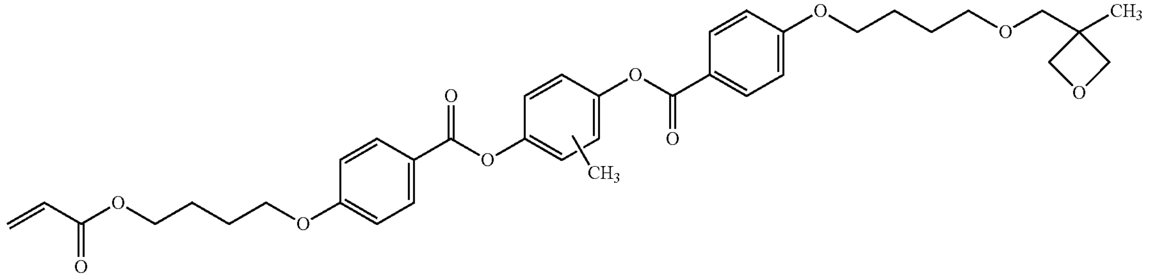

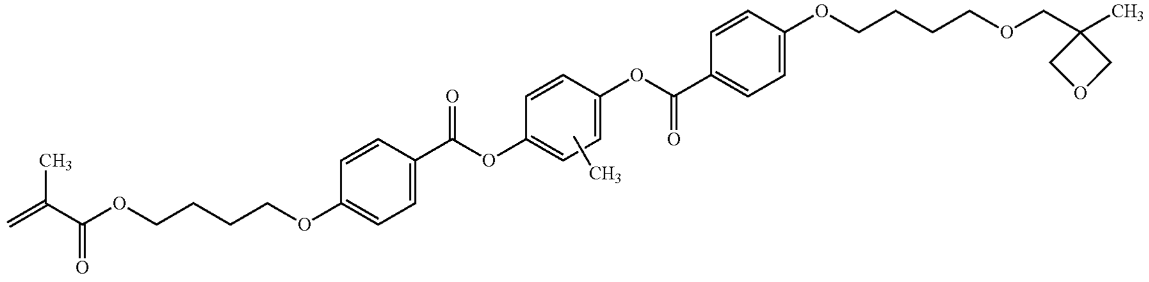

-continued
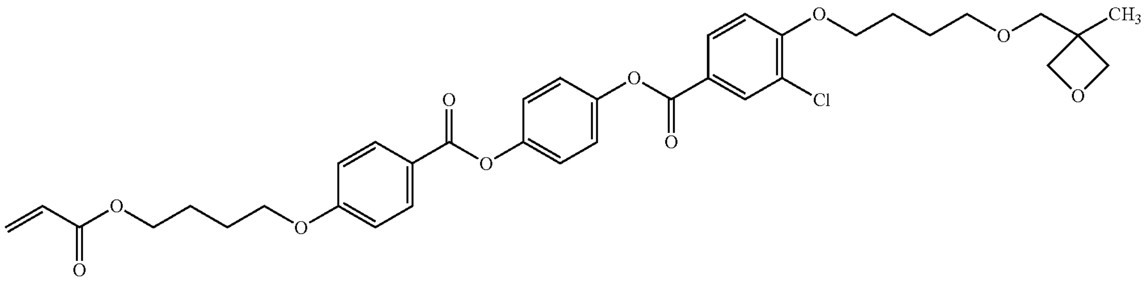
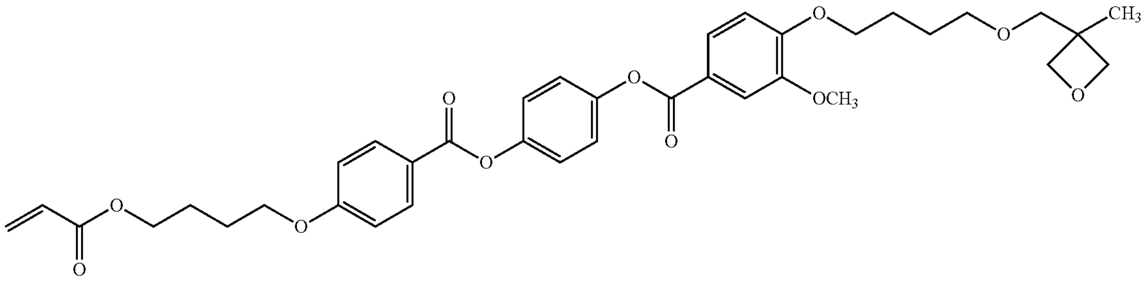
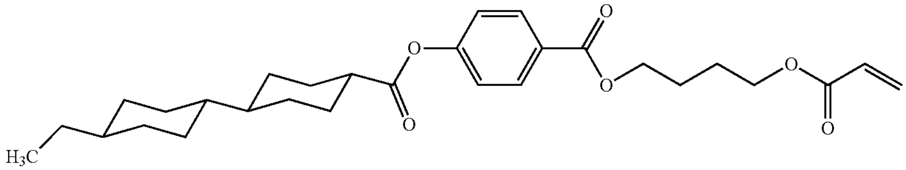
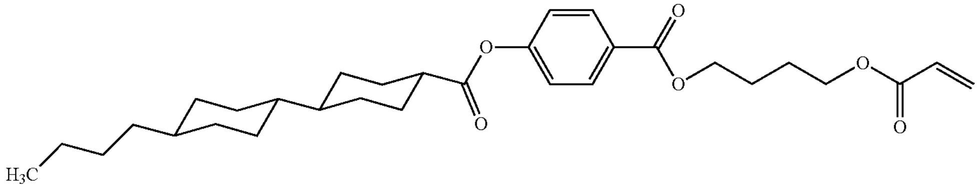
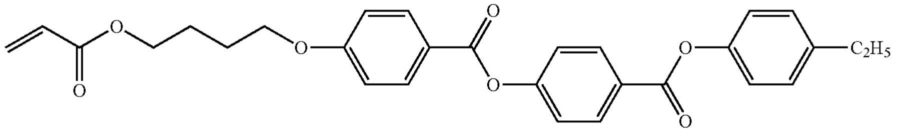
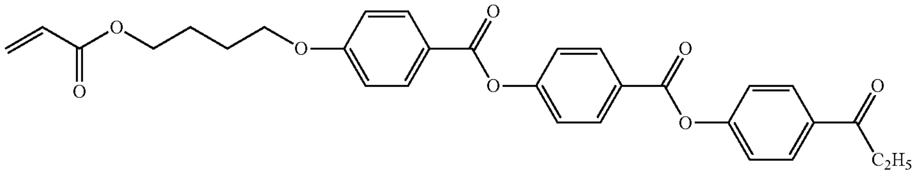
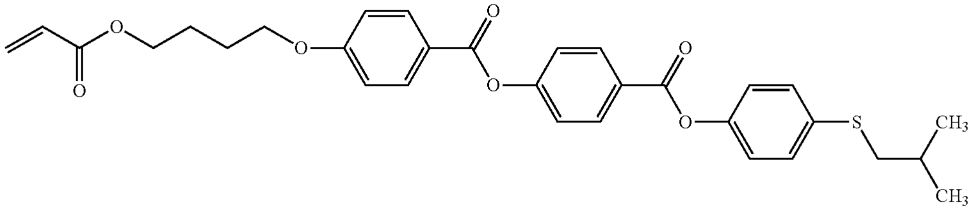
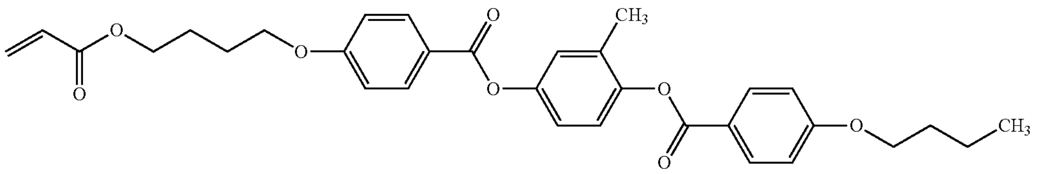

-continued

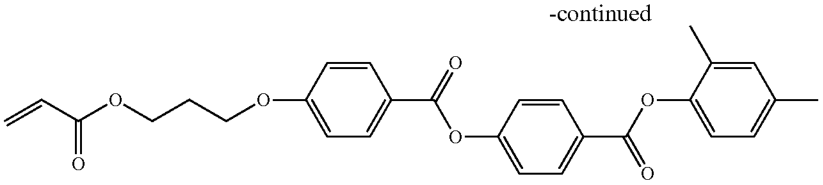

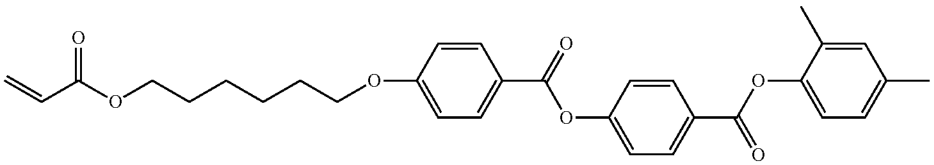

The composition according to the present disclosure may include one cholesteric liquid crystal compound, or may include two or more cholesteric liquid crystal compounds.

From the viewpoint of reduction of haze, stretchability, and thermal durability, the total amount of the specific liquid crystal compounds relative to the total amount of solids of the composition according to the present disclosure is preferably 25% by mass or more, more preferably from 30% by mass to 90% by mass, and still more preferably from 40% by mass to 80% by mass.

The composition according to the present disclosure may include other liquid crystal compounds. The "other liquid crystal compounds" refer to liquid crystal compounds other than the specific liquid crystal compounds. Examples of other liquid crystal compounds include a liquid crystal compound having neither an ethylenic unsaturated group nor a cyclic ether group, a liquid crystal compound having two or more ethylenic unsaturated groups but not having a cyclic ether group, a liquid crystal compound having two or more cyclic ether groups but not having an ethylenic unsaturated group, and a liquid crystal compound having two or more ethylenic unsaturated groups and two or more cyclic ether groups.

Among them, at least one selected from the group consisting of a liquid crystal compound having neither an ethylenic unsaturated group nor a cyclic ether group, a liquid crystal compound having two or more ethylenic unsaturated groups but not having a cyclic ether group, and a liquid crystal compound having two or more cyclic ether groups but not having an ethylenic unsaturated group is preferably contained as another liquid crystal compound. It is more preferable that at least one selected from the group consisting of a liquid crystal compound having neither an ethylenic unsaturated group nor a cyclic ether group, a liquid crystal compound having two or more ethylenic unsaturated groups but not having a cyclic ether group, and a liquid crystal compound having two or more cyclic ether groups but not having an ethylenic unsaturated group is contained as another liquid crystal compound. It is still more preferable that at least one selected from the group consisting of a liquid crystal compound having neither an ethylenic unsaturated group nor a cyclic ether group and a liquid crystal compound having two or more ethylenic unsaturated groups but not having a cyclic ether group is contained as another liquid crystal compound.

Rod-shaped liquid crystal compounds as other liquid crystal compounds may be selected from the compounds disclosed in *Makromol. Chem.*, vol. 190 (1989), p. 2255, *Advanced Materials*, vol. 5 (1993), p. 107, U.S. Pat. Nos. 4,683,327, 5,622,648, and 5,770,107, International Publication (WO) Nos. 95/22586, 95/24455, 97/00600, 98/23580, and 98/52905, Japanese Patent Application Laid-open (JP-A) Nos. H1-272551, H6-16616, H7-110469, H11-80081, and 2001-328973. Preferable rod-shaped liquid crystal compounds as other liquid crystal compounds may be selected from the compounds disclosed in Japanese Patent Application Laid-open (JP-A) Nos. H11-513019 and 2007-279688.

Preferable disc-shaped liquid crystal compounds as other liquid crystal compounds may be selected from the compounds disclosed in Japanese Patent Application Laid-open (JP-A) Nos. 2007-108732 and 2010-244038.

Specific examples of other liquid crystal compounds are shown below. However, other liquid crystal compounds are not limited to the following specific examples.

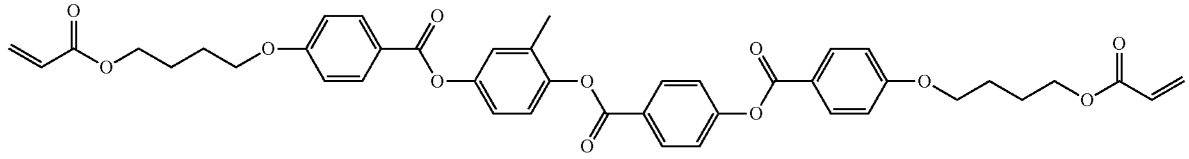

-continued
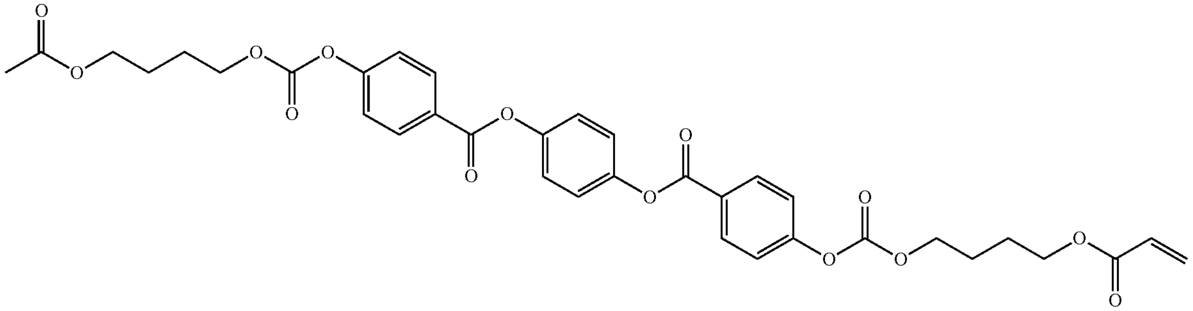
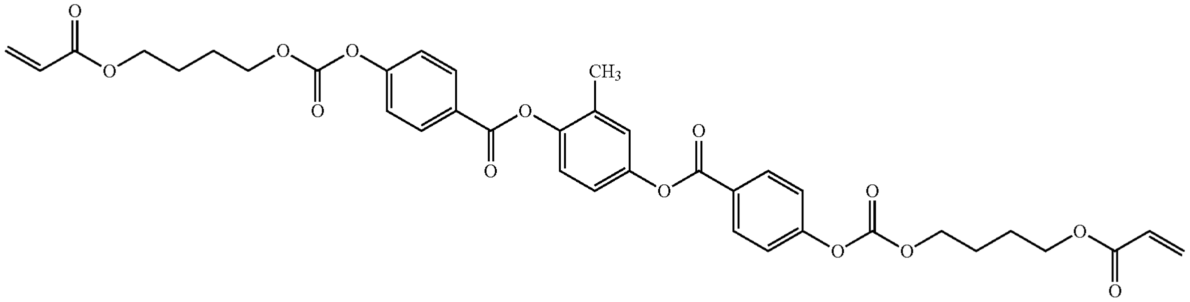
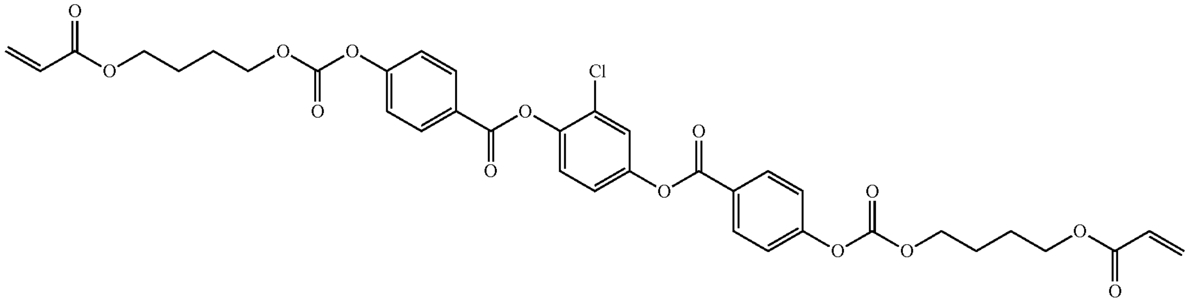
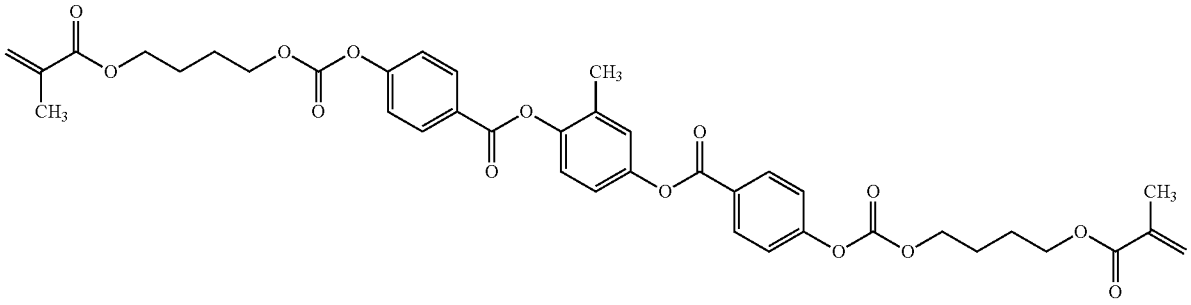
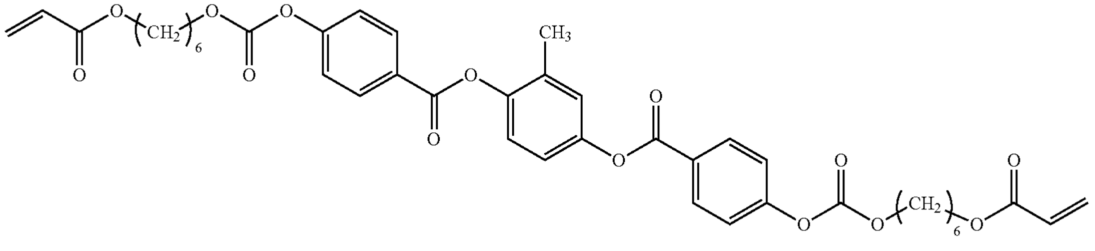
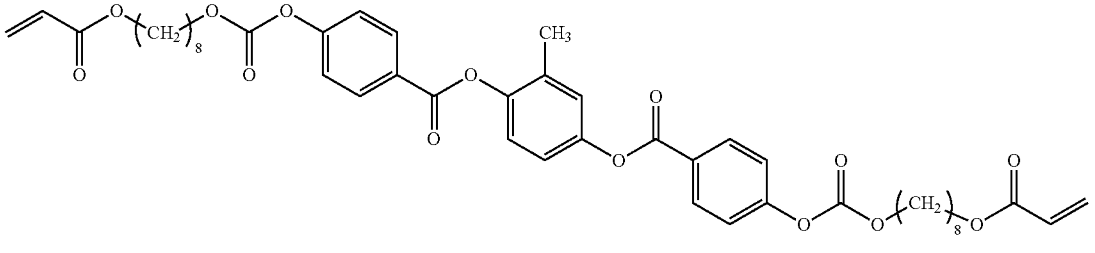

-continued

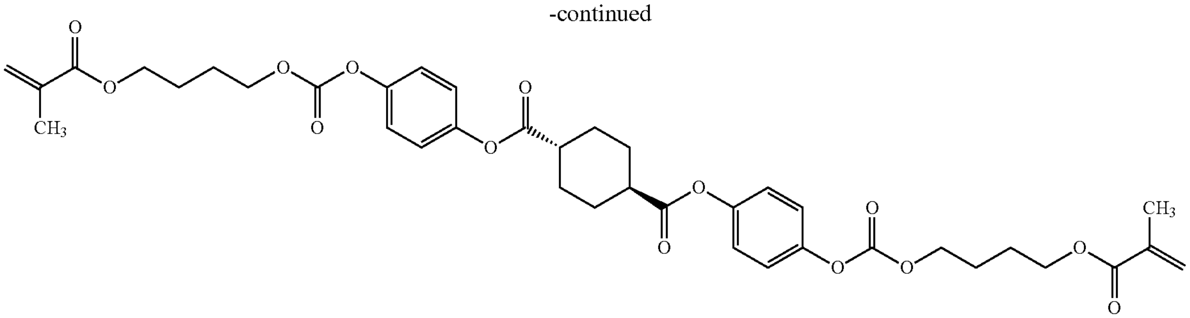

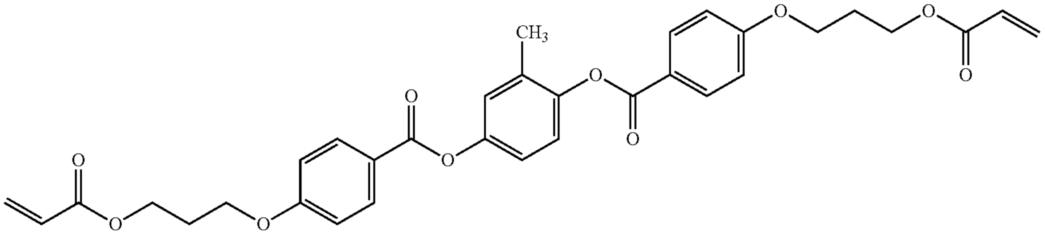

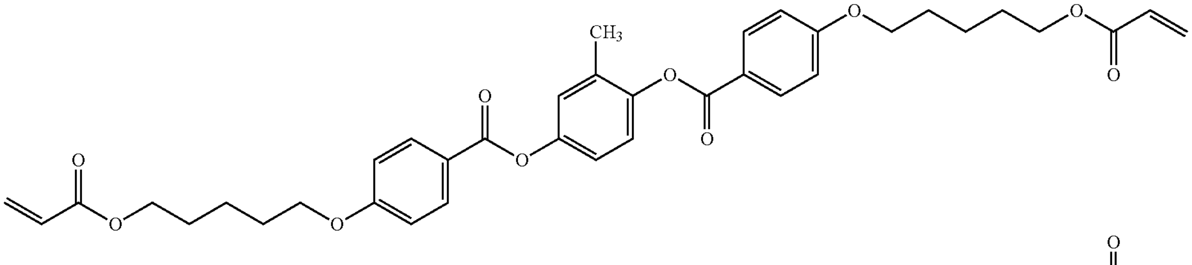

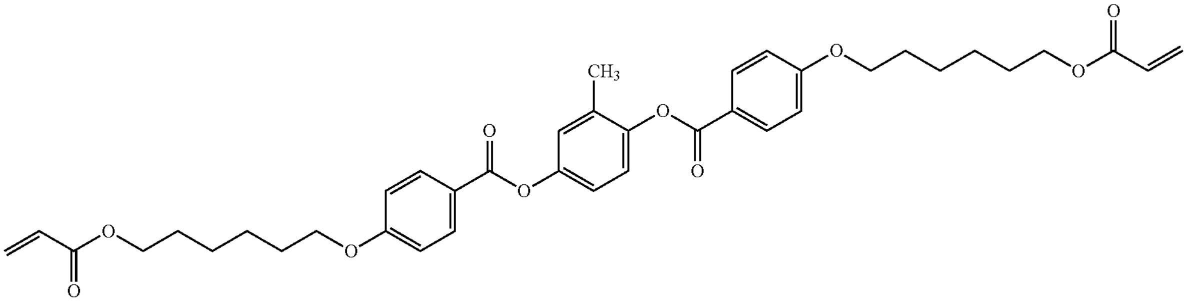

The composition according to the present disclosure may include one other liquid crystal compound, or may include two or more other liquid crystal compounds.

The proportion of the total amount of other liquid crystal compounds to the total amount of solids of the composition according to the present disclosure is preferably 70% by mass or less, more preferably 50% by mass or less, still more preferably 30% by mass or less, and particularly preferably 20% by mass or less. The lower limit of the above-described proportion is 0% by mass.

The composition according to the present disclosure may include one liquid crystal compound, or two or more liquid crystal compounds. The composition according to the present disclosure may include the specific liquid crystal compound and another liquid crystal compound.

The proportion of the total amount of liquid crystal compounds to the total amount of solids of the composition according to the present disclosure is preferably 25% by mass or more, more preferably from 30% by mass to 90% by mass, and still more preferably from 40% by mass to 80% by mass, from the viewpoint of improving reduction of haze, strechability, and thermal durability.

—Chiral Agent—

The composition according to the present disclosure preferably includes a chiral agent (i.e., an optically active compound), from the viewpoint of ease of forming a cholesteric liquid crystal layer and ease of adjusting a helical pitch.

The kind of the chiral agent may be determined in accordance with the kind of the liquid crystal compound and the desired helical structure (for example, the manner of twisting of the helix and the helical pitch). Examples of the chiral agent include known compounds (for example, the compounds disclosed in liquid Crystal Device Handbook, (1989, edited by 142th committee of Japan Society for the Promotion of Science), chapter 3, item 4-3, chiral agents for TN (twisted nematic) and STN (super-twisted nematic), p. 199), isosorbide derivatives, and isomannide derivatives.

Chiral agents, in general, includes an asymmetric carbon atom. However, axially chiral compounds and planar-chiral compounds, which do not include an asymmetric carbon atom, can also be used as chiral agents. Preferable examples of axially chiral compounds and planar-chiral compounds include binaphthyl compounds, helicene compounds, and paracyclophan compounds.

From the viewpoint of improving thermal durability, the composition according to the present disclosure may include a chiral agent that has a polymerizable group. The polymerizable group is preferably an ethylenic unsaturated group or a cyclic ether group, and more preferably an ethylenic unsaturated group, from the viewpoint of improving reactivity and thermal durability. Preferable aspects of the ethylenic unsaturated group in the chiral agent are the same as the preferable aspects of the ethylenic unsaturated group in the specific liquid crystal compound described above. Preferable aspects of the cyclic ether group in the chiral agent are the same as the preferable aspects of the cyclic ether group in the specific liquid crystal compound described above.

When the chiral agent has a polymerizable group, the kind of the polymerizable group in the chiral agent is preferably the same as the kind of the polymerizable group in the specific liquid crystal compound, from the viewpoint of reactivity and thermal durability. Further, the polymerizable group in the chiral agent is preferably the same as the polymerizable group in the specific liquid crystal compound.

It is preferable that a chiral agent having one ethylenic unsaturated group but not having a cyclic ether group, a chiral agent having one cyclic ether group and not having an ethylenic unsaturated group, or a chiral agent having one ethylenic unsaturated group and one cyclic ether group is contained as a chiral agent having a polymerizable group. Further, it is preferable that a chiral agent having one ethylenic unsaturated group but not having a cyclic ether group is contained as a chiral agent having a polymerizable group.

The chiral agent may be a liquid crystal compound.

—Photosensitive Chiral Agent—

The composition according to the present disclosure preferably includes a photosensitive chiral agent.

The photosensitive chiral agent, of which helical twisting power changes upon photoirradiation, will be described in detail.

The helical twisting power (HTP) of a chiral agent is a factor that indicates the ability to cause helical alignment and is represented by the following Expression (A):

$$\text{HTP}=1/(\text{length of helical pitch (unit: }\mu\text{m)}\times\text{concentration (\% by mass) of chiral agent with respect to liquid crystal compound) }[\mu\text{m}^{-1}] \qquad \text{Expression (A):}$$

The length of helical pitch refers to the length of pitch P of the helical structure (i.e., helical pitch) of the cholesteric liquid crystal phase, and can be measured according to the method described in *Ekishou Binran* (Liquid Crystal Bulletin), p. 196.

The photosensitive chiral agent, of which helical twisting power changes upon photoirradiation, may either be liquid crystalline or non-liquid crystalline. In general, photosensitive chiral agents often include an asymmetric carbon atom. The photosensitive chiral agent may be an axially chiral compound or a planar-chiral compound, which does not include an asymmetric carbon atom.

The photosensitive chiral agent may be a chiral agent of which helical twisting power is increased by photoirradiation, or a chiral agent of which helical twisting power is decreased by photoirradiation. Among then, the photosensitive chiral agent is preferably a chiral agent of which helical twisting power is decreased by photoirradiation.

In the present specification, the increase or decrease of the helical twisting power refers to an increase or decrease assuming that the initial (prior to photoirradiation) helical direction of the photosensitive chiral agent is a positive value. Therefore, a chiral agent corresponds to the "chiral agent of which helical twisting power decreases" even in a case in which the helical twisting power of the chiral agent continues to decrease under photoirradiation and the helical direction passes 0 and becomes a negative value (i.e., a case in which a helix in a helical direction opposite to the initial helical direction (prior to photoirradiation) is induced).

An example of the photosensitive chiral agent is a photoreactive chiral agent. The photoreactive chiral agent refers to a compound having a chiral site and a photoreactive portion that undergoes a structural change upon photoirradiation, and exhibiting a large change in the twisting power for a liquid crystal compound depending on the irradiation dose.

An example of the photoreactive moiety that undergoes a structural change upon photoirradiation is a photochromic compound (Kingo Uchida and Masahiro Irie, *Kagaku kogyo* (Chemical Industry), vol. 64 (1999), p. 640, and Kingo Uchida and Masahiro Irie, *Fine Chemical*, vol. 28(9) (1999), p. 15). The foregoing structural change means decomposition, addition reaction, isomerization, racemization, [2+2] photocyclization, dimerization, or the like which is caused by photoirradiation of a photoreactive moiety, and the structural change may be irreversible. The chiral site is, for example, the asymmetric carbon atom described in Hiroyuki Nohira, *Kagaku So-setsu* No. 22 *Ekishou-no-kagaku* (Chemical Review No. 22, Chemistry of Liquid Crystal) (1994), p. 73.

Examples of the photosensitive chiral agent include the photoreactive chiral agents disclosed in paragraphs [0044] to [0047] of JP-A No. 2001-159709, the optically active compounds disclosed in paragraphs [0019] to [0043] of JP-A No. 2002-179669, the optically active compounds disclosed in paragraphs [0020] to [0044] of JP-A No. 2002-179633, the optically active compounds disclosed in paragraphs [0016] to [0040] of JP-A No. 2002-179670, the optically active compounds disclosed in paragraphs [0017] to [0050] of JP-A No. 2002-179668, the optically active compounds disclosed in paragraphs [0018] to [0044] of JP-A No. 2002-180051, the optically active isosorbide derivatives disclosed in paragraphs [0016] to [0055] of JP-A No. 2002-338575, the photoreactive optically active compounds disclosed in paragraphs [0023] to [0032] of JP-A No. 2002-080478, the photoreactive chiral agents disclosed in paragraphs [0019] to [0029] of JP-A No. 2002-080851, the optically active compounds disclosed in paragraphs [0022] to [0049] of JP-A No. 2002-179681, the optically active compounds disclosed in paragraphs [0015] to [0044] of JP-A No. 2002-302487, the optically active polyesters disclosed in paragraphs [0015] to [0050] of JP-A No. 2002-338668, the binaphthol derivatives disclosed in paragraphs [0019] to [0041] of JP-A No. 2003-055315, the optically active fulgide compounds disclosed in paragraphs [0008] to [0043] of JP-A No. 2003-073381, the optically active isosorbide derivatives disclosed in paragraphs [0015] to [0057] of JP-A No. 2003-306490, the optically active isosorbide derivatives disclosed in paragraphs [0015] to [0041] of JP-A No. 2003-306491, the optically active isosorbide derivatives disclosed in paragraphs [0015] to [0049] of JP-A No. 2003-313187, the optically active isomannide derivatives disclosed in paragraphs [0015] to [0057] of JP-A No. 2003-313188, the optically active isosorbide derivatives disclosed in paragraphs [0015] to [0049] of JP-A No. 2003-313189, the optically active polyesters/amides disclosed in paragraphs [0015] to [0052] of JP-A No. 2003-313292, the optically active compounds disclosed in paragraphs [0012] to [0053] of WO 2018/194157, and the optically active compounds disclosed in paragraphs [0020] to [0049] of JP-A No. 2002-179682.

Among them, compounds having at least a photoisomerization moiety is preferable as photosensitive chiral agents, and the photoisomerization moiety more preferably has a photoisomerizable double bond. As the photoisomerization moiety having a photoisomerizable double bond, a cinnamoyl moiety, a chalcone moiety, an azobenzene moiety, or a stilbene moiety is preferable in that they easily undergo photoisomerization and exhibit a large difference in helical twisting power between before and after photoirradiation, and a cinnamoyl moiety, a chalcone moiety, or a stilbene moiety is more preferable in that they exhibit a small visible light absorption. The photoisomerization moiety reads on the above-described photoreactive moiety that undergoes a structural change upon photoirradiation.

The photosensitive chiral agent preferably has a trans-form photoisomerizable double bond in that the trans-form photoisomerizable double bond has a high initial (prior to photoirradiation) helical twisting power and exhibits a more favorable property in terms of the amount of change in helical twisting power caused by photoirradiation.

The photosensitive chiral agent preferably has a cis-form photoisomerizable double bond in that the cis-form photoisomerizable double bond has a low initial (prior to photoirradiation) helical twisting power and exhibits a more favorable property in terms of the amount of change in helical twisting power caused by photoirradiation.

The photosensitive chiral agent preferably has a partial structure selected from the group consisting of a binaphthyl partial structure, an isosorbide partial structure (a partial structure derived from isosorbide), and an isomannide partial structure (a partial structure derived from isomannide). The binaphthyl partial structure, the isosorbide partial structure, and the isomannide partial structure refers to the structures shown below.

The portion in which a solid line and a dashed line are present parallel to each other in the binaphthyl partial structure represents a single bond or a double bond. In the structures shown below, * represents the bonding position.

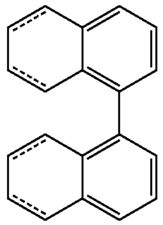

Binaphthyl Partial Structure

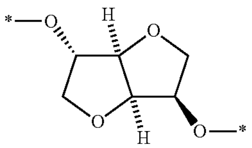

Isosorbide Partial Structure

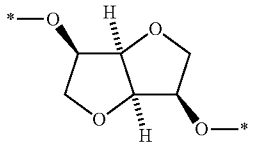

Isosmannide Partial Structure

The photosensitive chiral agent may have a polymerizable group. The kind of the polymerizable group is not particularly limited, and functional groups capable of an addition polymerization reaction are preferable, polymerizable ethylenic unsaturated groups or cyclic polymerizable groups are more preferable, and (meth)acryloyl group, a vinyl group, a styryl group, or an allyl group is still more preferable.

A compound represented by Formula (C) is preferable as a photosensitive chiral agent.

R-L-R Formula (C)

Each R independently represents a moiety having at least one moiety selected from the group consisting of a cinnamoyl moiety, a chalcone moiety, an azobenzene moiety, and a stilbene moiety.

L represents a divalent connecting group formed by removing two hydrogen atoms from the structure represented by Formula (D) (a divalent connecting group formed by two hydrogen atoms from the binaphthyl partial structure described above), a divalent connecting group represented by Formula (E) (a divalent connecting group formed from the isosorbide partial structure described above), or a divalent connecting group represented by Formula (F) (a divalent group formed from the isomannide partial structure described above).

In Formula (E) and Formula (F), * represents the bonding position.

Formula (D)

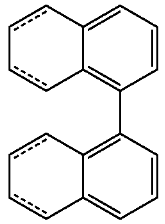

Formula (E)

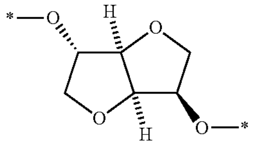

Formula (F)

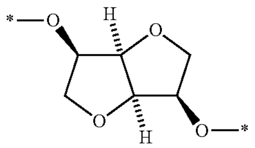

In the composition according to the present disclosure, only one photosensitive chiral agent may be used, or two or more photosensitive chiral agents may be used.

The molar absorption coefficient of the photosensitive chiral agent is not particularly limited. The molar absorption coefficient of the photosensitive chiral agent at a wavelength of the light used for irradiation in the twist change step described below (for example, at 365 nm) is preferably from 100 L/(mol·cm) to 100,000 L/(mol·cm), and more preferably from 500 L/(mol·cm) to 50,000 L/(mol·cm).

—Polymerizable Chiral Agent—

The composition according to the present disclosure may include a polymerizable chiral agent as a chiral agent, from the viewpoint of further facilitating the fixing of the helical structure of a cholesteric liquid crystal compound. The polymerizable chiral agent means a chiral agent that has a polymerizable group. The polymerizable chiral agent as used herein exhibits no change in helical twisting power upon photoirradiation, and is distinguished from the photosensitive chiral agent.

Examples of the polymerizable group that the polymerizable chiral agent has include radical-polymerizable groups and cation-polymerizable groups. The polymerizable group is preferably an ethylenic unsaturated group, an epoxy group, or an aziridinyl group, and more preferably an ethylenic unsaturated group.

The polymerizable chiral agent is preferably a compound that includes an asymmetric carbon atom, but may be an axially chiral compound or planar-chiral compound that does not include an asymmetric carbon atom. Examples of the axially chiral compound and the planar-chiral compound include binaphthyl, helicene, paracyclphane, and derivatives thereof.

When the cholesteric liquid crystal layer includes a cholesteric liquid crystal compound that has a polymerizable group, the polymerizable chiral agent preferably includes the same type of polymerizable group as the polymerizable group of the cholesteric liquid crystal compound. For example, in a case in which the cholesteric liquid crystal compound has a radical-polymerizable group, the polymerizable chiral agent also preferably includes a radical-polymerizable group. This allows for the formation of a polymer in which the cholesteric liquid crystal compound having a polymerizable group and the polymerizable chiral agent are polymerized, and allows the helical structure of the cholesteric liquid crystal compound to be more easily fixed.

The polymerizable chiral agent is preferably an isosorbide derivative, an isomannide derivative, or a binaphthyl derivative. An example of a commercially available isosorbide derivative is PALIOCOLOR LC756 manufactured by BASF.

The polymerizable chiral agent may be used singly, or in combination of two or more thereof.

The composition according to the present disclosure may include one chiral agent, or may include two or more chiral agents.

The content of the chiral agent may be set in accordance with, for example, the structure of the liquid crystal compound and the desired helical pitch. The proportion of the total amount of the chiral agent to the total amount of solids of the composition is preferably from 1% by mass to 20% by mass, more preferably from 2% by mass to 15% by mass, and still more preferably from 3% by mass to 10% by mass, from the viewpoint of ease of the formation of a cholesteric liquid crystal layer and ease of the adjustment of the helical pitch.

The helical pitch and the selective reflection wavelength of the cholesteric liquid crystal phase can be adjusted not only by the kind of liquid crystal compound, but can also be easily adjusted by the content of the chiral agent. For example, a doubled content of the chiral agent in the composition would reduce the helical pitch to half, and would also reduce the central value of the selective reflection wavelength to half in some cases.

The composition according to the present disclosure preferably includes a polymerization initiator. The polymerization initiator promotes a curing reaction of the composition.

In a case in which the composition according to the present disclosure is cured by exposure to light, the composition according to the present disclosure preferably includes a photopolymerization initiator. Examples of the photopolymerization initiator include photo-radical-polymerization initiators and photo-cation-polymerization initiators.

Examples of the photopolymerization initiator include α-carbonyl compounds (such as those disclosed in U.S. Pat. Nos. 2,367,661 and 2,367,670), acyloin ether compounds (such as those disclosed in U.S. Pat. No. 2,448,828), α-hydrocarbon-substituted aromatic acyloin compounds (such as those disclosed in U.S. Pat. No. 2,722,512), polynuclear quinone compounds (such as those disclosed in U.S. Pat. Nos. 3,046,127 and 2,951,758), combinations of a triarylimidazole dimer and a p-aminophenyl ketone (such as those disclosed in U.S. Pat. No. 3,549,367), oxadiazole compounds (such as those disclosed in U.S. Pat. No. 4,212,970), and acridine compounds and phenazine compounds (such as those disclosed in JP-A No. S60-105667 and U.S. Pat. No. 4,239,850)

Preferable examples of photo-radical-polymerization initiators include α-hydroxy alkylphenone compounds, α-amino alkylphenone compounds, and acylphosphine oxide compounds.

Preferable examples of photo-cation-polymerization initiators include iodonium salt compounds and sulfonium salt compounds.

The composition according to the present disclosure preferably includes a radical-polymerization initiator or a cation-polymerization initiator, and more preferably includes a photo-radical-polymerization initiator or a photo-cation-polymerization initiator.

From the viewpoint of improving thermal durability, the composition that includes a liquid crystal compound having one ethylenic unsaturated group preferably includes a radical-polymerization initiator, and more preferably includes a photo-radical-polymerization initiator.

From the viewpoint of improving thermal durability, the composition that includes a liquid crystal compound having one cyclic ether group preferably includes a cation-polymerization initiator, and more preferably includes a photo-cation-polymerization initiator.

The composition according to the present disclosure may include one polymerization initiator, or may include two or more polymerization initiators.

The content of polymerization initiator may be set in accordance with the structure of the specific liquid crystal compound and the desired helical pitch. From the viewpoint of ease of the formation of a cholesteric liquid crystal layer, ease of the adjustment of the helical pitch, polymerization rate, and the strength of the cholesteric liquid crystal layer, the proportion of the total amount of polymerization initiators with respect to the total amount of solids of the composition is preferably from 0.05% by mass to 10% by mass, more preferably from 0.05% by mass to 5% by mass, still more preferably from 0.1% by mass to 2% by mass, and particularly preferably from 0.2% by mass to 1% by mass.

The composition according to the present disclosure may include a crosslinking agent, from the viewpoint of enhancement of the strength and improvement of durability of the cholesteric liquid crystal layer after curing. Preferable crosslinking agents are, for example, compounds that are cured by external factors such as ultraviolet rays, heat, and moisture.

Examples of the crosslinking agent include the following compounds:

(1) polyfunctional acrylate compounds (for example, trimethylolpropane tri(meth)acrylate and pentaerythritol tri(meth)acrylate);

(2) epoxy compounds (for example, glycidyl (meth)acrylate and ethyleneglycol diglycidyl ether);

(3) acridine compounds (for example, 2,2-bishydroxymethylbutanol-tris[3-(1-aziridinyl) propionate] and 4,4-bis(ethyleneiminocarbonylamino) diphenylmethane);
(4) isocyanate compounds (for example, hexamethylene diisocyanate and biuret-type isocyanate);
(5) polyoxazoline compounds having an oxazoline group at a side chain; and
(6) alkoxysilane compounds (for example, vinyltrimethoxysilane and N-(2-aminoethyl) 3-aminopropyl trimethoxysilane.

The composition according to the present disclosure may include one crosslinking agent, or may include two or more crosslinking agents.

From the viewpoint of the strength and durability of the cholesteric liquid crystal layer, the proportion of the total amount of crosslinking agents to the total amount of solids of the composition is preferably from 1% by mass to 20% by mass, and more preferably from 3% by mass to 15% by mass.

The composition according to the present disclosure may include a known catalyst, depending on the reactivity of the crosslinking agent. Combined use of a crosslinking agent and a catalyst not only improves the strength and durability of the cholesteric liquid crystal layer but also improves productivity.

The composition according to the present disclosure may include a polyfunctional polymerizable compound. The term "polyfunctional polymerizable compound" means a compound having two or more polymerizable groups. The kinds of the two or more polymerizable groups contained in the polyfunctional polymerizable compound are preferably the same.

Examples of the polyfunctional polymerizable compound include a liquid crystal compound having two or more ethylenic unsaturated groups but not having a cyclic ether group, a liquid crystal compound having two or more cyclic ether groups but not having an ethylenic unsaturated group, a liquid crystal compound having two or more ethylenic unsaturated groups and two or more cyclic ether groups, and a chiral agent having two or more polymerizable groups and a crosslinking agent having two or more polymerizable groups. It is preferable that at least one selected from the group consisting of a liquid crystal compound having two or more ethylenic unsaturated groups but not having a cyclic ether group, a liquid crystal compound having two or more cyclic ether groups but not having an ethylenic unsaturated group, and a chiral agent having two or more polymerizable groups is contained as a polyfunctional polymerizable compound, and it is more preferable that a chiral agent having two or more polymerizable groups is contained as a polyfunctional polymerizable compound.

The composition according to the present disclosure may include one polyfunctional polymerizable compound, or may include two or more polyfunctional polymerizable compounds.

From the viewpoint of reduction of an alignment structure change after polymerization, the proportion of the total amount of polyfunctional polymerizable compounds with respect to the total amount of solids of the composition is preferably from 0.5% by mass to 50% by mass, more preferably from 1% by mass to 40% by mass, still more preferably from 1.5% by mass to 30% by mass, and particularly preferably from 2% by mass to 20% by mass.

Further, from the viewpoint of reduction of an alignment structure change after polymerization, the proportion of the total amount of the compound having two or more ethylenic unsaturated groups, the compound having two or more cyclic ether groups, and the compound having one or more ethylenic unsaturated groups and one or more cyclic ether groups with respect to the total amount of solids of the composition is preferably from 0.5% by mass to 50% by mass, more preferably from 1% by mass to 40% by mass, still more preferably from 1.5% by mass to 30% by mass, and particularly preferably from 2% by mass to 20% by mass.

The composition according to the present disclosure may include other additives, as necessary. Examples of other additives include surfactants, polymerization inhibitors, antioxidants, horizontal orientation agent, UV absorbers, photostabilizers, coloring agents, and metal oxides having a refractive index of less than 1.8. The composition according to the present disclosure may include one kind of other additive, or may include two or more kinds of other additives.

In a case in which the composition is cured in the process of forming a liquid crystal film, the proportion of the total amount of solvents to the total amount of solids of the composition at the time of curing the composition is preferably 5% by mass or less, more preferably 3% by mass or less, still more preferably 2% by mass or less, and particularly preferably 1% by mass or less.

Curing of the composition according to the present disclosure in a case of, for example, containing a polymerization initiator is carried out, for example, by exposure to light. The exposure to light is carried out by irradiating the liquid crystal composition with light. An example of a preferable light source is a light source that can emit a light including at least one selected from the group consisting of 365 nm and 405 nm. Examples of specific light sources include ultrahigh pressure mercury lamp, high pressure mercury lamp, and metal halide lamp. The light exposure amount is preferably from 5 $mJ/cm^2$ to 2,000 $mJ/cm^2$, and more preferably from 10 $mJ/cm^2$ to 1,000 $mJ/cm^2$. The light exposure method to be applied may be a method described in paragraph [0035] to [0051] of Japanese Patent Application Laid-open (JP-A) No. 2006-23696.

It is preferable that the composition is exposed to light while the composition is heated, in order to facilitate alignment of the liquid crystal compound. The heating temperature may be set, for example, in accordance with the makeup of the composition. The heating temperature is, for example, from 60 °C to 120 °C. Examples of the heating means include a heater, an oven, a hot plate, an infrared lamp, and an infrared laser.

The curing of the composition is carried out, for example, by heating. The heating temperature is preferably from 60 °C to 200 °C. The heating time is preferably from 5 minutes to 2 hours. Examples of the heating means include the above-described heating means.

The composition may be dried using a known method, prior to curing. The composition may be dried by being left to stand still or by air drying. The composition may alternatively be dried by heating.

The method used for the production of the composition according to the present disclosure is not particularly limited, and ordinarily used methods for producing a composition may be applied. The composition can be produced, for example, by mixing the particles having a refractive index of 1.8 or more, the polymer compound represented by Formula (1), and a solvent, and subjecting the resultant mixture to a dispersing treatment using a circulation-type dispersing device (bead mill) or the like.

[Applications]

The composition according to the present disclosure may be used in various uses, without particular restrictions.

The composition may be used, for example, in the liquid crystal film described below, a decorative film, or a light-modulating film.

The composition according to the present disclosure can be suitably used in optical members such as microlenses, optical waveguides, antireflection films, sealing materials for LED, and chip coating materials for LED, or used as a visibility-reducing cured material for a wiring electrode for use in a tough panel.

Further, the composition according to the present disclosure can be suitably used, for example, in a planarization film or an interlayer dielectric film in a liquid crystal display device, an organic EL device, or the like, a protective film for a color filter, a spacer for maintaining a constant thickness of a liquid crystal layer in a liquid crystal display device, or a structural member of a microelectro mechanical system (MEMS) device.

(Liquid Crystal Film)

The liquid crystal film according to the present disclosure is a liquid crystal film obtained by removing at least a part of the solvent from the composition according to the present disclosure that include a liquid crystal compound.

The proportion of the total amount of solvent with respect to the total mass of the liquid crystal film is preferably 5% by mass or less, more preferably 3% by mass or less, still more preferably 2% by mass or less, and particularly preferably 1% by mass or less.

The thickness of the liquid crystal film is not particularly limited, and may be set in accordance with the application. The thickness of the liquid crystal film is preferably from 0.3 μm to 15 μm, more preferably from 0.5 μm to 9 μm, and still more preferably from 0.6 μm to 7 μm.

[Alignment Layer]

The liquid crystal film may include an alignment layer. The alignment layer is used in order to more easily align the molecules of the cholesteric liquid crystal compound in light-reflection portions during the formation of a liquid crystal film.

The alignment layer is formed, for example, by rubbing treatment on an organic compound (preferably, a polymer), oblique evaporation of an inorganic compound, or provision of a layer having a microgroove. An alignment layer of which alignment function is imparted by application of an electric field, application of a magnetic field, or photo-irradiation is also known.

The thickness of the alignment layer is not particularly limited, and is preferably from 0.01 μm to 10 μm.

Depending on the kind of base material/underlying material, the underlying material may be used as an alignment layer, without separately providing an alignment layer. For example, a base material that itself has been subjected to an aligning treatment (for example, a rubbing treatment) can function as an alignment layer. The base material that can itself be subjected to an alignment treatment is, for example, a layer formed from polyethylene terephthalate (PET), which may be subjected to a rubbing treatment in the below-described manner.

A rubbing-treated alignment layer and a photo-aligned layer are described below as preferable examples.

Rubbing-Treated Alignment Layer

The rubbing-treated alignment layer is formed, for example, by performing a rubbing treatment on a surface of the underlying material to which the composition is to be applied. The rubbing treatment can be carried out, for example, by rubbing a surface of a film including a polymer as a main component with paper or cloth in a fixed direction. General methods for rubbing treatment are described, for example, in "Ekishou Binran" (Liquid Crystal Bulletin) (Oct. 30, 2000, published by Maruzen).

Examples of a polymer for an alignment layer capable of forming the layer including a polymer as a main component include a methacrylate-based copolymer described in paragraph [0022] of Japanese Patent Application Laid-open (JP-A) No. H8-338913, a styrene-based copolymer, a polyolefin, polyvinyl alcohol, a modified polyvinyl alcohol, poly(N-methylolacrylamide), a polyester, a polyimide, a vinyl acetate copolymer, carboxymethylcellulose, and polycarbonate. The polymer for an alignment layer may be a silane coupling agent. The polymer for an alignment layer is preferably a water-soluble polymer (for example, poly(N-methylolacrylamide), carboxymethylcellulose, gelatin, polyvinyl alcohol, or a modified polyvinyl alcohol), more preferably gelatin, polyvinyl alcohol, or a modified polyvinyl alcohol, and particularly preferably polyvinyl alcohol or a modified polyvinyl alcohol.

As a method for changing rubbing density, methods described in "Ekishou Binran" (Liquid Crystal Bulletin) (published by Maruzen) may be used. Rubbing density (L) is expressed as a numerical value according to the following Equation (A):

$$L=Nl(1+2\pi rn/60v) \quad \text{Equation (A)}$$

In Equation (A), N represents the number of rubbings, l represents the contact length of the rubbing roller, r represents the radius of the roller, n represents the number or revolutions (revolutions per minute, rpm) of the roller, and v represents the stage moving speed (per second).

Methods for increasing the rubbing density include a method in which the number of rubbings is increased, a method in which the contact length of the rubbing roller is increased, a method in which the radius of the roller is increased, a method in which the number of revolutions of the roller is increased, and a method in which the stage moving speed is decreased. Methods for decreasing the rubbing density include a method in which the number of rubbings is decreased, a method in which the contact length of the rubbing roller is decreased, a method in which the radius of the roller is decreased, a method in which the number of revolutions of the roller is decreased, and a method in which the stage moving speed is increased. With respect to the conditions of the rubbing treatment, the disclosure of Japanese Patent No. 4052558 may be referenced.

—Photo-Aligned Layer—

Examples of a photo-alignment material used in a photo-aligned layer formed by photo-irradiation include azo compounds described in Japanese Patent Application Laid-open (JP-A) Nos. 2006-285197, 2007-76839, 2007-138138, 2007-94071, 2007-121721, 2007-140465, 2007-156439, 2007-133184, and 2009-109831, and Japanese Patent Nos. 3883848 and 4151746; aromatic ester compounds described in Japanese Patent Application Laid-open (JP-A) No. 2002-229039; maleimide and/or alkenyl-substituted nadimides having photo-alignable unit and described in Japanese Patent Application Laid-open (JP-A) Nos. 2002-265541 and 2002-317013; photo-crosslinkable silane derivatives described in Japanese Patent Nos. 4205195 and 4205198; and photo-crosslinkable polyimides, polyamides, or esters described in Japanese National-phase Publication (JP-A) Nos. 2003-520878 and 2004-529220 and Japanese Patent No. 4162850. Among others, the photo-alignment material is preferably an azo compound, or a photo-crosslinkable polyimide, polyamide, or ester.

A layer formed from a photo-alignment material is subjected to irradiation with linearly polarized light or unpolarized light, to produce a photo-aligned layer.

In the present disclosure, irradiation with linearly polarized light refers to an operation to cause a photo-reaction of a photo-alignment material. The wavelength of the light to be used varies with the photo-alignment material to be used, and is not particularly limited as long as it is a wavelength necessary for the photo-reaction. The light used for photo-irradiation is preferably a light having a peak wavelength of from 200 nm to 700 nm, and more preferably a UV light having a peak wavelength of 400 nm or less.

The light source used for photo-irradiation may be a known light source, such as: a lamp such as a tungsten lamp, a halogen lamp, a xenon lamp, a xenon flash lamp, a mercury lamp, a mercury xenon lamp, or a carbon arc lamp; any of various lasers (for example, a semiconductor laser, a helium neon laser, an argon ion laser, a helium cadmium laser, or a YAG laser); a light-emitting diode; or a cathode-ray tube.

Methods for obtaining linearly polarized light include a method in which a polarization plate (for example, an iodine polarization plate, a dichroic colorant polarization plate, or a wire grid polarization plate) is used, a method in which a prism-based element (for example, Glan-Thompson prism) or a reflection-type polarizer utilizing a Brewster's angle is used, and a method in which light emitted from a laser light source and having polarization is used. Here, selective irradiation only with a light having the requisite wavelength may be performed using, for example, a filter or a wavelength conversion element.

In a case in which the light used for irradiation is linearly polarized light, there is a method in which irradiation is performed with light falling on the upper face or rear face of the alignment layer, in a vertical or oblique direction with respect to the surface of the alignment layer. The incident angle of the light varies with the photo-alignment material, and the incident angle is preferably from 0° to 90° (orthogonal), and more preferably from 40° to 90°, relative to the photo-aligned layer.

When unpolarized light is used, unpolarized light is allowed to fall on the upper face or rear face of the alignment layer, in an oblique direction. The incident angle is preferably from 10° to 80°, more preferably from 20° to 60°, and still more preferably from 30° to 50°. The irradiation time is preferably from 1 minute to 60 minutes, and more preferably from 1 minute to 10 minutes.

<Method of Producing Liquid Crystal Film>

The method used for producing the liquid crystal film according to the present disclosure is not particularly limited. Known method may be used, or known methods after adaptation may be used. In a case in which the liquid crystal film is a cholesteric liquid crystal layer, for example, a preferable example of the method include a step (hereinafter also referred to as a "liquid crystal material provision step") of providing a liquid crystal material that includes a base material and a layer (hereinafter also simply referred to as a "liquid crystal layer") containing the composition according to the present disclosure including a cholesteric liquid crystal compound and a photosensitive chiral agent, a step (hereinafter also referred to as a "first light exposure step") of irradiating the liquid crystal layer with a first light so as to deactivate a portion of the photosensitive chiral agent that is present in a region of the liquid crystal layer extending from the surface to the interior in the thickness direction, and a step (hereinafter also referred to as a "second light exposure step") of performing irradiation with a second light so as to cure the uncured portion. In a case in which the above method is used, a liquid crystal film having a region in which the helical pitch of the cholesteric liquid crystal structure gradually changes (gradationally) in the thickness direction can be prepared easily.

The above example is described in detail below.

The foregoing example of the method of producing the liquid crystal film according to the present disclosure preferably includes a step (hereinafter also referred to as "first heating step") of heating the liquid crystal layer so as to form a cholesteric liquid crystal phase.

[Liquid Crystal Material Provision Step]

The liquid crystal material provision step is a step of providing a liquid crystal material that includes a base material and a liquid crystal layer containing a cholesteric spirally-aligned liquid crystal compound (cholesteric liquid crystal compound) and a photosensitive chiral agent.

The composition according to the present disclosure that includes a cholesteric liquid crystal compound and a photosensitive chiral agent is used for forming the liquid crystal layer.

—Base Material—

The above-described base materials may be used as the base material.

—Liquid Crystal Layer—

The liquid crystal layer preferably includes a cholesteric liquid crystal compound capable of being aligned in a cholesteric spiral alignment, and a photosensitive chiral agent, and may also include other components, if necessary.

The method used for applying the composition to the base material is not particularly limited, and examples thereof include the spray coating method, the spin coating method, the blade coating method, the dip coating method, the casting method, the roll coating method, the bar coating method, the die coating method, the mist method, the inkjet method, the dispenser method, the screen printing method, the letterpress printing method, and the intaglio printing method.

In a case in which the composition includes a solvent, the composition may be dried after being applied to a base material. Examples of the method used for drying include drying by heating and drying at a reduced pressure. In the case of drying by heating, the heating temperature and the heating time may be adjusted, as appropriate, in accordance with the type of the solvent. The drying by heating may be performed as a part of the first heating step described below.

[First Heating Step]

The first heating step is a step including heating the liquid crystal layer so as to form a cholesteric liquid crystal phase. As the heating temperature increases during heating of a cholesteric liquid crystal compound, the cholesteric liquid crystal compound is transformed from a liquid crystal state into an aligned state, and then from the aligned state into an isotropic state. In the first heating step, the cholesteric liquid crystal compound is turned into an aligned state by heating the liquid crystal layer that includes the cholesteric liquid crystal compound, so that the liquid crystal layer gets into a cholesteric liquid crystal phase in which cholesteric liquid crystal compound molecules are aligned.

The relationship between the state change of the cholesteric liquid crystal compound and the heating temperature varies with the type of the cholesteric liquid crystal compound. Therefore, the heating temperature in the first heating step may be adjusted, as appropriate, in accordance with the type of the cholesteric liquid crystal compound, such that the cholesteric liquid crystal compound gets into an aligned state. The heating time in the first heating step may be adjusted, as appropriate, in accordance with, for example, the heating temperature. The heating means is not particularly limited, and an oven, a hot plate, or the like may be used.

[First Light Exposure Step]

In the first light exposure step, the liquid crystal layer is irradiated with a first light so as to deactivate a portion of the photosensitive chiral agent present in a region of the liquid crystal layer that extends from the surface to the interior in the thickness direction.

In an example of the first light exposure step, the first light is allowed to fall from the base material side or the top layer side, so that the photosensitive chiral agent contained in the liquid crystal layer absorbs the light, whereby the deactivation amount of the photosensitive chiral agent at a side closer to the light source is made to be greater than the deactivation amount of the photosensitive chiral agent at a side further from the light source. Preferably, an aspect can be realized in which the amount of active photosensitive chiral agent gradationally increases in the layer thickness direction from a surface of the liquid crystal layer at the first light irradiation side.

In the aspect in which the amount of active photosensitive chiral agent gradationally increases from a surface of the liquid crystal layer at the first light irradiation side, re-twisting of the helix of the cholesteric liquid crystal structure occurs in accordance with the amount of the photosensitive chiral agent before the liquid crystal layer is cured in the second light exposure step, and a liquid crystal layer of which helical pitch changes gradationally can be obtained.

In the first light exposure step, irradiation with the first light may be carried out once, or may be carried out two or more times. In the case of performing light exposure two or more times, the light exposure conditions (for example, the exposure means, the exposure wavelength, the exposure amount, the exposure atmosphere, and the like) may be adjusted for the respective light exposures, as necessary.

The kind of the first light is not particularly limited, and is preferably a UV radiation when the reactivity of the components contained in the liquid crystal layer is considered. Examples thereof include: discharge lamps such as an ultrahigh pressure mercury lamp, a high pressure mercury lamp, and a metal halide lamp; and semiconductor light sources such as a light emission diode (LED) and a laser diode (LD).

The wavelength range of the first light is not particularly limited. In a case in which the first light is an ultraviolet radiation, the wavelength range is preferably 400 nm or less, more preferably 360 nm or less, and still more preferably 300 nm or less. Use of a light having a wavelength range of 300 nm or less facilitates the regulation of photo-curing state distribution in the thickness direction, due to photo-absorption exhibited by the cholesteric liquid crystal compound. The wavelength range can be controlled, for example, by a method using an optical filter, a method using two or more kinds of optical filters, or a method using a light source fora specific wavelength.

The amount of exposure to the first light is not particularly limited, and is preferably from 0.1 $mJ/cm^2$ to 2,000 $mJ/cm^2$, for example, in a case in which the first light is a ultraviolet radiation. From the viewpoint of regulating photo-curing state distribution in in-plane directions, the parallelism of the ultraviolet rays is preferably 200 or less, and more preferably 10° or less.

In a case in which light is allowed to fall from a side of the base material that is opposite from a side at which the liquid crystal layer is provided, the first light exposure step may be carried out in a low-oxygen atmosphere (having an oxygen concentration of 1,000 ppm or less; that is, an atmosphere including no oxygen or including oxygen at from more than 0 ppm to 1,000 ppm), and is preferably carried out in an oxygen-containing atmosphere (in the atmospheric air or in an atmosphere that contains from 1000 ppm to less than 21% of oxygen). Since radical polymerization is inhibited by oxygen, regulation of photo-curing state distribution in the thickness direction is more facilitated.

From the viewpoint of promoting curing of the liquid crystal layer, the first light exposure step is preferably carried out in a low-oxygen atmosphere (preferably an atmosphere having an oxygen concentration of 1,000 ppm or less; that is, an atmosphere including no oxygen or including oxygen at from more than 0 ppm to 1,000 ppm), and more preferably carried out in a nitrogen atmosphere.

The first light exposure step is preferably performed at 50 °C or lower, more preferably performed at 40 °C or lower, and particularly preferably performed at from 0 °C to 35 °C, from the viewpoint of maintaining changes in the helical pitch of the liquid crystal layer.

In the first light exposure step, the first light may be allowed to fall through a first patterning mask that has plural regions having mutually different transmittances with respect to the first light. This enables plural regions of the liquid crystal layer to be exposed at different exposure amounts; therefore, it becomes possible to form plural regions having mutually different thicknesses distributed in in-plane directions in a single layer, and to regulate the reflectance distribution in in-plane directions all at once.

In the first light exposure step, the first light may be allowed to fall through a filter of which transmittance varies with wavelength. The filter may be a filter that regulates the first light exposure amount.

An example is a mask having a reduced transmittance (for example, 0%) with respect to a wavelength that is absorbed by the photopolymerization initiator to be used, so that a polymerization initiating species will not be generated from the photopolymerization initiator.

Examples of the first patterning mask include a photomask having a pattern formed by etching a metal film, and a photomask on which pattern printing has been performed using any of various printing methods (for example, printing using a laser printer or an inkjet printer, gravure printing, and screen printing). The photomask having a pattern formed by etching a metal film is obtained, for example, by performing patterning using a photoresist after a metallic chromium film is formed on a quartz substrate by sputtering.

Examples of the filter favorably include a filter including a dielectric multilayer film vapor-deposited on a transparent substrate such as glass. Known band-pass filters, for example, may be used as the filter.

In a case in which irradiation with the first light is performed using the first patterning mask or a filter, the first patterning mask or the filter may be disposed at a side of the base material that is opposite from a side at which the liquid crystal layer is provided, or may be disposed at a side of the base material at which the liquid crystal layer is provided.

In a case in which the first patterning mask or the filter is disposed at a side of the base material at which the liquid crystal layer is provided, the irradiation with the first light may be performed with the first patterning mask or the filter contacting the liquid crystal layer, or may be performed with a gap provided between the liquid crystal layer and the first patterning mask.

In a case in which the first patterning mask or the filter is disposed at a side of the base material that is opposite from a side at which the liquid crystal layer is provided, it is preferable to use a light-transmitting base material since the liquid crystal layer is exposed to the first light coming through the base material.

With respect to the light transmitting property of the base material, the transmittance with respect to the first light is not particularly limited; a higher transmittance is more preferred from the viewpoint of further facilitating curing of the liquid crystal layer.

In a case in which irradiation with the first light is performed using the first patterning mask or a filter, only one kind of first patterning mask or filter may be used, or two or more kinds of first patterning masks or filters may be used.

It is also contemplated to use the first patterning mask and a filter together.

[Second Light Exposure Step]

The second light exposure step is a step of curing the liquid crystal layer by irradiation with a second light. The helical pitch of the liquid crystal layer that has been changed in the first light exposure step is cured and fixed by irradiation with a second light.

In the second light exposure step, the entire liquid crystal layer may be exposed, rather than only uncured portions being exposed. For example, the second light may be allowed to fall from a side of the base material at which the liquid crystal layer is provided.

The kind of the second light is not particularly limited, and is preferably a UV radiation when the reactivity of the components that may be contained in the liquid crystal compound is considered. Examples of UV radiation sources include: discharge lamps such as an ultrahigh pressure mercury lamp, a high pressure mercury lamp, and a metal halide lamp; and semiconductor light sources such as a light emission diode (LED) and a laser diode (LD).

The wavelength range of the second light is not particularly limited. For example, a light within a wavelength range of from 250 nm to 400 nm may be used. The wavelength range can be controlled, for example, by a method using an optical filter, a method using two or more kinds of optical filters, or a method using a light source fora specific wavelength.

The amount of exposure to the second light is not particularly limited, and is preferably from 5 $mJ/cm^2$ to 2,000 $mJ/cm^2$, for example, in a case in which the second light is a ultraviolet radiation.

The second light exposure step is preferably carried out in a low-oxygen atmosphere (preferably an atmosphere that has an oxygen concentration of 1,000 ppm or less; that is, an atmosphere including no oxygen or including oxygen at from more than 0 ppm to 1,000 ppm), and is more preferably carried out in a nitrogen atmosphere.

The second light exposure step is preferably performed at 50 °C or lower, more preferably performed at 40 °C or lower, and still more preferably performed at from 0 °C to 35 °C, from the viewpoint of maintaining changes in the helical pitch of the liquid crystal layer until curing.

[Other Steps]

The method of producing the liquid crystal film according to the present disclosure may include steps other than the foregoing steps, if necessary. Examples of the other steps include a colored layer forming step, an alignment layer forming step, and a step of forming another layer. The specifics and method of forming of the colored layer and the alignment layer are as described above. The specifics of the other layer are as described above, and known methods may be used as methods for forming the other layer.

(Film)

A film according to the present disclosure includes a cured layer formed by curing a layer that is obtained by removing at least a part of the solvent from the composition according to the present disclosure or the film described above.

The film according to the present disclosure can suitably be used, for example, as a refractive index controlling layer, an interlayer insulating film, a wiring protection film, or the like in a display device or the like.

The film according to the present disclosure can particularly suitably be used as a film that includes a liquid crystal layer formed by curing a liquid crystal film, as described below.

(Film Including Liquid Crystal Layer Formed by Curing Liquid Crystal Film)

A film according to the present disclosure that includes a liquid crystal layer formed by curing a liquid crystal film includes a liquid crystal layer formed by curing the liquid crystal film according to the present disclosure.

The liquid crystal layer is preferably a cholesteric liquid crystal layer. The cholesteric liquid crystal layer preferably includes a cholesteric liquid crystal compound, from the viewpoint of visibility of display.

Preferable examples of the means used for producing changes in the helical pitch of the cholesteric liquid crystal structure, preferably gradational changes, include: a means for performing light exposure at low temperatures so as to prevent diffusion of the photosensitive chiral agent; and a means for regulating the activation of the photopolymerization initiator so as to ensure that the time it takes for the cholesteric liquid crystal compound to gradationally align is appropriately provided.

The cholesteric liquid crystal layer is a layer that includes a cholesteric liquid crystal phase. The cholesteric liquid crystal phase is detected by a known means (for example, a polarization microscope or a scanning electron microscope).

It is known that a cholesteric liquid crystal phase is formed by spiral alignment of plural liquid crystal compound molecules. The alignment state of the liquid crystal compound in the cholesteric liquid crystal phase may be an alignment state in which right-hand circularly polarized light is reflected, an alignment state in which left-hand circularly polarized light is reflected, or an alignment state in which both of right-hand circularly polarized light and left-hand circularly polarized light are reflected. The alignment state of the liquid crystal compound in the cholesteric liquid crystal phase may be fixed. The alignment state of the liquid crystal compound is fixed, for example, by polymerization or crosslinking of the liquid crystal compound. In some or all of liquid crystal compound molecules of which alignment state has been fixed, the crystallinity of the liquid crystal compound may be lost.

The film according to the present disclosure that includes a liquid crystal layer formed by curing a liquid crystal film is preferably a decorative film.

The cholesteric liquid crystal layer contributes to the design of the decorative film. For example, the color of the decorative film and the degree of variation in color of the decorative film dependent on the viewing angle are regulated by the helical pitch of the cholesteric liquid crystal phase, the refractive index of the cholesteric liquid crystal layer, and the thickness of the cholesteric liquid crystal layer. The helical pitch may be controlled by the addition amount of the chiral agent. The relationship between the helical structure and the chiral agent is described, for example, in Fujifilm Research Report No. 50 (2005), pp. 60-63. The helical pitch may be controlled based on conditions such as the temperature, illuminance, and irradiation time during fixing of the cholesteric liquid crystal phase. The cholesteric liquid crystal layer particularly preferably includes a region at which the helical pitch of the cholesteric liquid crystal structure changes along the thickness direction, from the viewpoints of visibility of display, visibility of decoration, and reduction of color change depending on the viewing angle.

The film according to the present disclosure that includes a liquid crystal layer formed by curing a liquid crystal film may include two or more cholesteric liquid crystal layers. The compositions of the two or more cholesteric liquid crystal layers may be the same as or different from each other.

From the viewpoint of reflectance, the thickness of the cholesteric liquid crystal layer is preferably from 0.3 μm to 15 μm, more preferably from 0.5 μm to 9 μm, and still more preferably from 0.6 μm to 7 μm. In a case in which the decorative film includes two or more cholesteric liquid crystal layers, it is preferable that the thicknesses of the two or more cholesteric liquid crystal layers are each independently within the foregoing ranges.

The components of the cholesteric liquid crystal layer are selected from known cholesteric liquid crystal layer components in accordance with, for example, the desired properties of the cholesteric liquid crystal layer. Examples of the components of the cholesteric liquid crystal layer include the components of the below-described liquid crystal composition. In this regard, in a case in which the cholesteric liquid crystal layer is formed through curing of the liquid crystal composition, all or part of the amount of polymerizable compound in the liquid crystal composition may form a polymer (the scope of which includes an oligomer) in the cholesteric liquid crystal layer. The polymerizable compound is, for example, a compound having a polymerizable group.

The cholesteric liquid crystal layer is preferably a layer formed by curing the composition according to the present disclosure that includes a liquid crystal compound.

The thickness of the liquid crystal layer is not particularly limited. The thickness of the liquid crystal layer is preferably from 0.1 μm to 10 μm, more preferably from 0.3 μm to 8 am, and still more preferably from 0.5 μm to 6 μm, from the viewpoint of obtaining more appropriate reflectance.

The film according to the present disclosure may further include the alignment layer described above.

[Base Material]

The film may include a base material. The inclusion of a base material heightens the strength of the film, thereby making the handling easier. In a case in which the film includes a base material, the base material may be used as a member in a molded product obtained by molding the film.

In an aspect in which the film includes a base material, the liquid crystal layer may be provided directly on the base material, or may be provided with another layer disposed therebetween.

The shape and material of the base material are not particularly limited, and may be appropriately selected, as desired. In a case in which a film is subjected to molding, the base material is preferably a resin base material from the viewpoint of ease of molding.

Examples of the material of the base material include polyethylene (PE), polyethylene naphthalate (PEN), polyamide (PA), polyethylene terephthalate (PET), polyvinyl chloride (PVC), polyvinyl alcohol (PVA), polyacrylonitrile (PAN), polyimide (PI), poly(methyl methacrylate) (PMMA), polycarbonate (PC), an acrylic-polycarbonate resin, polyacrylate, polymethacrylate, polypropylene (PP), polystyrene (PS), polyacrylonitrile-butadiene-styrene copolymer (ABS), a cyclic olefin copolymer (COC), a cycloolefin polymer (COP), triacetyl cellulose (TAC), a urethane resin, and a urethane-acrylic resin. From the viewpoint of the strength of the film and from the viewpoint of molding processability in the case of subjecting the film to molding, the material of the base material is preferably at least one resin selected from the group consisting of polyethylene terephthalate, an acrylic resin, a urethane resin, a urethane-acrylic resin, polycarbonate, an acrylic-polycarbonate resin, and polypropylene. The base material may be a laminated body of plural resin layers formed from different materials.

The resin base material may include an additive, if necessary. Examples of the additive include: lubricants such as a mineral oil, a hydrocarbon, a fatty acid, an alcohol, a fatty acid ester, a fatty acid amide, a metallic soap, a natural wax, and a silicone; inorganic flame retardants such as magnesium hydroxide and aluminum hydroxide; organic flame retardants such as a halogen-based flame retardant and a phosphorus-based flame retardant; organic or inorganic fillers such as metal powder, talc, calcium carbonate, potassium titanate, glass fibers, carbon fibers, and wood powder; antioxidants, UV protectors, sliding agents, dispersants, coupling agents, foaming agents, coloring agents, and resins other than the main component resin.

The resin base material may be a commercially available product. Examples of the commercially available product include TECHNOLLOY (registered trademark) series (an acrylic resin film, a polycarbonate resin film, or an acrylic resin/polycarbonate resin laminated film, manufactured by Sumitomo Chemical Co., Ltd.), an ABS film (manufactured by Okamoto Industries, Inc.), an ABS sheet (manufactured by Sekisui Seikei Co., Ltd.), TEFLEX (registered trademark) series (a PET film, manufactured by Teijin Film Solutions), LUMIRROR (registered trademark) easily moldable type (a PET film, manufactured by Toray Industries, Inc.), and PURETHERMO (a polypropylene film, manufactured by Idemitsu Unitech Co., Ltd.).

The thickness of the base material is not particularly limited, and is preferably 1 μm or more, more preferably 10 μm or more, and still more preferably 20 μm or more, from the viewpoint of the strength of the film and the viewpoint of molding processability in the case of subjecting the film to molding. From a similar viewpoint, the thickness of the base material is preferably 300 μm or less, more preferably 200 μm or less, and still more preferably 150 μm or less.

For example, in a case in which the film includes a base material, the remainder left after peeling off the base material from the film including the base material may be used as a film.

[Colored Layer]

The film may include a colored layer. The inclusion of a colored layer makes it easier to obtain a desired design. The colored layer is a layer that includes a coloring agent. Only one colored layer may be provided, or two or more colored layers may be provided.

In the film, the position of the colored layer is not particularly limited, and the colored layer may be provided at a desired position. The colored layer may be provided on the liquid crystal layer, for example. In a case in which the film includes a base material, the colored layer may be provided at a side opposite from a side of the base material at which the liquid crystal layer is formed, and the colored layer may be provided on a film that is the remainder left after peeling off the base material from a film including the base material.

The color of the colored layer is not particularly limited, and may be selected, as appropriate, in accordance with, for example, the use of the film. Examples of the color of the colored layer include black, gray, white, red, orange, yellow, green, blue violet, and brown. The color of the colored layer may be a metallic color.

—Coloring Agent—

The coloring agent may be either a pigment or a dye. From the viewpoint of durability, the coloring agent is preferably a pigment. In order to impart metallic appearance to the coloring layer, metal particles, pearl pigments, and the like may be used as coloring agents.

The pigment may be either an inorganic pigment or an organic pigment.

Examples of the inorganic pigment include white pigments such as titanium dioxide, zinc oxide, lithopone, precipitated calcium carbonate, white carbon, aluminum oxide, aluminum hydroxide, and barium sulfate; black pigments such as carbon black, titanium black, titanium carbon, iron oxide, and graphite; iron oxide, barium yellow, cadmium red, and chromium yellow.

Examples of the inorganic pigment also include the inorganic pigments disclosed in paragraphs [0015] and [0114] of Japanese Patent Application Laid-open (JP-A) No. 2005-7765.

Examples of the organic pigment include; phthalocyanine pigments such as phthalocyanine blue and phthalocyanine green; azo-based pigments such as azo red, azo yellow, and azo orange; quinacridone pigments such as quinacridone red, cinquasia red, and cinquasia magenta; perylene pigments such as perylene red and perylene maroon; carbazole violet, anthrapyridine, flavanthrone yellow, isoindoline yellow, indanthrone blue, dibromoanzanthrone red, anthraquinone red, and diketopyrrolopyrrole.

Specific examples of the organic pigment include: red pigments such as C. I. Pigment Red 177, 179, 224, 242, 254, 255, and 264; yellow pigments such as C. I. Pigment Yellow 138, 139, 150, 180, and 185; orange pigments such as C. I. Pigment Orange 36, 38, and 71; green pigments such as C. I. Pigment Green 7, 36, and 58; blue pigments such as C. I. Pigment Blue 15:6; and violet pigments such as C. I. Pigment Violet 23.

Examples of the organic pigment further include the organic pigments described in paragraph [0093] of Japanese Patent Application Laid-open (JP-A) No 2009-256572.

The pigment may be a pigment having a light transmitting property and a light reflecting property (so-called glittering pigment). Examples of the glittering pigment include glittering metal pigments of aluminum, copper, zinc, iron, nickel, tin, aluminum oxide and alloys thereof, interference mica pigment, white mica pigment, graphite pigment, and glass flake pigment. The glittering pigment may be uncolored or may be colored.

One coloring agent may be used singly, or two or more coloring agents may be used together. In a case in which two or more coloring agents are used, an inorganic pigment and an organic pigment may be combined.

From the viewpoint of exhibiting a desired color, the content of the coloring agent is preferably from 1% by mass to 50% by mass, more preferably from 5% by mass to 50% by mass, and particularly preferably from 10% by mass to 40% by mass, with respect to the total amount of the colored layer.

—Binder Resin—

The colored layer preferably includes a binder resin from the viewpoints of strength, scratch resistance, and suitability for molding processing. The kind of the binder is not particularly limited. The binder resin is preferably a transparent resin from the viewpoint of obtaining a desired color, and, specifically, the binder resin is preferably a resin having a total light transmittance of 80% or higher. The total light transmittance can be measured using a spectrophotometer (for example, spectrophotometer UV-2100 manufactured by Shimadzu Corporation).

Examples of the binder resin include an acrylic resin, a silicone resin, a polyester, a polyurethane, and a polyolefin. The binder resin may be a homopolymer or a copolymer.

One binder resin may be used singly, or two or more binder resins may be used together.

From the viewpoint of molding processability, the content of the binder resin is preferably from 5% by mass to 70% by mass, more preferably from 10% by mass to 60% by mass, and particularly preferably from 20% by mass to 60% by mass, with respect to the total amount of the colored layer.

—Dispersant—

The colored layer may include a dispersant from the viewpoint of improving dispersibility of the coloring agent contained in the colored layer, particularly a pigment. Inclusion of a dispersant improves the dispersibility of the coloring agent in the colored layer. This makes it easier to obtain a film having a uniform color.

The dispersant may be selected, as appropriate, in accordance with the kind, shape, and the like of the coloring agent. The dispersant is preferably a polymer dispersant.

Examples the polymer dispersant include a silicone polymer, an acrylic polymer, and a polyester polymer. In a case in which it is desired to impart, for example, heat resistance to the film, the dispersant is preferably a silicone polymer such as a graft-type silicone polymer.

The weight average molecular weight of the dispersant is preferably from 1,000 to 5,000,000, more preferably from 2,000 to 3,000,000, and particularly preferably from 2,500 to 3,000,000. In a case in which the weight average molecular weight is 1,000 or more, the dispersibility of the coloring agent further improves.

The dispersant may be a commercially available product. Commercially available products of the dispersant include: EFKA 4300 (acrylic polymer dispersant) manufactured by BASF Japan; HOMOGENOL L-18, HOMOGENOL L-95, and HOMOGENOL L-100 manufactured by Kao Corporation; SOLSPERSE 20000 and SOLSPERSE 24000 manufactured by Lubrizol Japan; and DISPERBYK-110, DISPERBYK-164, DISPERBYK-180, and DISPERBYK-182 manufactured by Byk-Chemie Japan. Here, HOMOGENOL, SOLSPERSE, and DISPERBYK are all registered trademarks.

Only one dispersant may be used, or two or more dispersants may be used together.

The content of the dispersant is preferably from 1 part by mass to 30 parts by mass with respect to 100 parts by mass of the coloring agent.

—Additives—

The colored layer may include an additive, if necessary, besides the above-described components. The additive is not particularly limited, and examples thereof include: the surfactants described in paragraph [0017] of Japanese Patent No. 4502784 and paragraphs [0060] of Japanese Patent Application Laid-open (JP-A) No. 2009-237362; anti-thermal-polymerization agents described in paragraph [0018] of Japanese Patent No. 4502784 (also referred to as "polymerization inhibitors", a preferable example of which is phenothiazine); and the additives described in paragraphs [0058] to [0071] of Japanese Patent Application Laid-open (JP-A) No. 2000-310706.

—Thickness—

The thickness of the colored layer is not particularly limited. The thickness of the colored layer is preferably 0.5 μm or more, more preferably 3 μm or more, still more preferably from 3 μm to 50 μm, and particularly preferably from 3 μm to 20 μm, from the viewpoints of visibility and three-dimensional moldability.

In a case in which there are two or more colored layers, it is preferable that each of the colored layers independently has a thickness that is within the thickness ranges described above.

—Method of Forming Colored Layer—

Examples of the method used for forming a colored layer include a method in which a composition for forming a colored layer is used, and a method in which a colored film is bonded. Among them, the method used for forming a colored layer is preferably a method in which a composition for forming a colored layer is used.

Examples of the method in which a colored layer is formed using a composition for forming a colored layer include a method in which a composition for forming a colored layer is applied so as to form a colored layer, such as a method in which a composition for forming a colored layer is applied by printing so as to form a colored layer. Examples of the printing method include screen printing, inkjet printing, flexographic printing, gravure printing, and offset printing.

The composition for forming a colored layer may be a composition that includes a coloring agent, and, if necessary, at least one of a binder resin, a dispersant, or an additive. The kind of each component may be as described above in the explanation of the colored layer.

The content of the coloring agent is preferably from 1% by mass to 50% by mass, more preferably from 5% by mass to 50% by mass, and particularly preferably from 10% by mass to 40% by mass, with respect to the total solids content of the composition for forming a colored layer.

The content of the binder resin is preferably from 5% by mass to 70% by mass, more preferably from 10% by mass to 60% by mass, and particularly preferably from 20% by mass to 60% by mass, with respect to the total solids content of the composition for forming a colored layer.

The content of the dispersant is preferably from 1 part by mass to 30 parts by mass with respect to 100 parts by mass of the coloring agent.

The colored layer may be a layer formed by curing a composition for forming a colored layer. For example, a composition for forming a colored layer that includes a polymerizable compound and a polymerization initiator may be used. The polymerizable compound and the polymerization initiator are not particularly limited, and known polymerizable compounds and known polymerization initiators may be used. One polymerizable compound may be used singly, or two or more polymerizable compounds may be used together. One polymerization initiator may be used singly, or two or more polymerization initiators may be used together.

The composition for forming a colored layer may include an organic solvent, from the viewpoint of facilitating coating. The organic solvent is not particularly limited, and known organic solvents may be used. Examples of the organic solvent include an alcohol, an ester, an ether, a ketone, and an aromatic hydrocarbon. One organic solvent may be used singly, or two or more organic solvents may be used together.

The content of the organic solvent is preferably from 5% by mass to 90% by mass, and more preferably from 30% by mass to 70% by mass, with respect to the total amount of the composition for forming a colored layer.

Commercially available coating materials such as NAX REAL series, NAX ADMILA series, and NAX MULTI series (manufactured by Nippon Paint Co., Ltd.) and RETAN PG series (manufactured by Kansai Paint Co., Ltd.) may be used as compositions for forming a colored layer.

The method used for preparing the composition for forming a colored layer is not particularly limited, and the composition for forming a colored layer is prepared, for example, by mixing respective components such as a coloring agent. In a case in which the composition for forming a colored layer includes a pigment as a coloring agent, it is preferable, from the viewpoint of further heightening the uniformity of dispersion and dispersion stability of the pigment, that the composition for forming a colored layer is prepared by preparing a pigment dispersion liquid that contains a pigment and a dispersant in advance, and mixing other components into the pigment dispersion liquid.

[Other Layers]

The film may include a layer other than the liquid crystal layer, the colored layer, and the alignment layer.

Examples of the other layer include a protective layer, a pressure-sensitive adhesive layer, an easy adhesion layer, a UV absorbing layer, a self-repairing layer, an antistatic layer, an antifouling layer, an electromagnetic shielding layer, and an electrically conductive layer, which are known layers in films.

The other layer may be formed using a known method. An example is a method that includes applying a composition that includes the components to be contained in the layer (a composition for forming the layer) in a layer form, followed by drying.

<Arrangement of Respective Layers>

The arrangement of the respective layers of the film are not limited. The respective layers of the film may be arranged as follows, in which "/" represents a boundary between layers. The left side indicates the viewing side.

(1) Liquid Crystal Layer
(2) Liquid Crystal Layer/Base Material
(3) Liquid Crystal Layer/Pressure-sensitive Adhesive Layer/Base Material
(4) Liquid Crystal Layer/Base Material/Colored Layer
(5) Liquid Crystal Layer/Pressure-sensitive Adhesive Layer/Base Material/Colored Layer The use of the film according to the present disclosure is not particularly limited, and the film can be suitably used as, for example, a decorative film for electronic devices (for example, wearable devices and smart phones), home electric appliances, audio products, computers, displays, and display devices of vehicle-mounted devices and the like. Among them, the film according to the present disclosure is particularly suitably used as a decorative film for electronic devices (for example, wearable devices and smart phones). Further, the film according to the present disclosure has excellent three-dimensional moldability, and, therefore, is used, for example, in molding such as three-dimensional molding or insert molding. The film according to the present disclosure is suitable as a film to be molded, and more suitable as a film for three-dimensional molding.

(Molded Product, Article, and Display Device)

The film according to the present disclosure can be used in various uses, and can be used, for example, as a molded product formed by molding the film.

The molded product according to the present disclosure is a molded product formed by molding the film according to the present disclosure.

The article according to the present disclosure is an article that includes the film according to the present disclosure or the molded product according to the present disclosure.

The film or the molded product may be included in various articles.

Examples of such articles include electronic devices such as smart phones, mobile phones, and tablets, automobiles, electric products, and packaging containers. Among others, the film or the molded product can be suitably used in electronic devices. More preferable examples of electronic devices include display devices such as displays, smart phones, mobile phones, and tablets.

Among them, the film or the molded product can particularly suitably be used in an ordinary display, or in a display part of a display device such as a smart phone, a home electric appliance, an audio product, a computer, or a vehicle-mounted product.

Especially, the display device according to the present disclosure is preferably a display device that includes a film including a liquid crystal layer formed by curing the liquid crystal film according to the present disclosure.

The means for obtaining the molded product by molding the film is not particularly limited, and may be a known method such as three-dimensional molding or insert molding. The means for applying the film to the article is not particularly limited, and known methods may be used, as appropriate, in accordance with the kind of the article.

(Dispersant)

A dispersant according to the present disclosure includes a polymer compound represented by Formula (1)

$$(A^1-R^2\rightarrow_n R^1-(P^1)_m \qquad (1)$$

In Formula (1), m represents a positive number of 8 or less; n represents a number of from 1 to 9; m+n is from 2 to 10; Formula (1) as a whole has at least one mesogen structure, $R^1$ represents an (m+n)-valent connecting group; $R^2$ represents a single bond or a divalent connecting group; $A^1$ represents a monovalent group having at least one kind of group selected from the group consisting of an acid group, an alkyl group, or an aryl group; n $A^1$'s and n $R^2$'s may be the same or different; $P^1$ represents a polymer chain; m $P^1$'s may be the same or different; at least one of n $A^1$'s represents an alkyl group having an acid group or an aryl group having an acid group.

Preferable aspects of the polymer compound represented by Formula (1) in the dispersant according to the present disclosure are the same as the preferable aspects of the polymer compound represented by Formula (1) in the composition according to the present disclosure described above.

The dispersant according to the present disclosure may include one polymer compound represented by Formula (1) singly, or may include two or more polymer compounds represented by Formula (1).

The content of the polymer compound represented by Formula (1) in the dispersant according to the present disclosure is preferably from 20% by mass to 100% by mass, more preferably from 50% by mass to 100% by mass, and particularly preferably from 80% by mass to 100% by mass, with respect to the total mass of the dispersant.

The dispersant according to the present disclosure may include a resin other than the polymer compound represented by Formula (1) (another resin) as a dispersant or may not include another resin. In a case in which the dispersant according to the present disclosure includes another resin, the content of the other resin in the dispersant according to the present disclosure is preferably smaller than the content of the polymer compound represented by Formula (1).

Suitable examples of the other resin in the dispersant according to the present disclosure include the resins that are described above as the other resin in the composition according to the present disclosure.

EXAMPLES

The present disclosure is more specifically described below with reference to examples. However, the scope of the present disclosure is not limited to the specific examples described below.

Example 1

[Preparation of Composition 1 and Composition 1-1]

Composition 1 made up of the following ingredients was prepared, and subjected to dispersing treatment for approximately from 0.5 hours to 2 hours until a desired particle size distribution was achieved, using DELTA MIXER SE-08 manufactured by Taitec Corporation. Thereafter, filtration was performed using a filter cloth, thereby preparing Composition 1-1, which is a zirconium oxide particle dispersion liquid having a zirconium oxide concentration of 15% by mass.

—Make-Up of Composition 1—

$ZrO_2$ (PCPR) (a solution in ethyl acetate having a zirconium oxide particle concentration of 50% by mass, with an average particle size of 10 nm and a refractive index of particles of 2.11, manufactured by Pixelligent): 0.3 parts by mass Methyl ethyl ketone (manufactured by Fujifilm Wako Pure Chemical Corporation): 0.4 parts by mass Polymer Compound (B-1) (a polymer compound represented by Formula (1)): 0.3 parts by mass Zirconia Beads (diameter: 50 μm, manufactured by Nikkato Corporation): 2.5 parts by mass

[Measurement of Particle Size Distribution]

10 μL of Composition 1-1 prepared as described above and 990 μL of methyl ethyl ketone (manufactured by Fujifilm Wako Pure Chemical Corporation) were mixed with each other to form a dilute solution, particle size distribution measurement was performed using NANOSAQLA (manufactured by Otsuka Electronics Co., Ltd.), and the median diameter D50 was obtained.

Evaluation criteria are as follows:

A: D50≤40 nm

B: 40 nm<D50≤80 nm

C: 80 nm<D50≤120 nm

D: D50>120 nm

[Synthesis of Intermediate DPMA-K-1-1.8 of Polymer Compound]

Polymer compound (B-1) was synthesized according to the synthesis method described in paragraphs [0266] to [0348] of Japanese Patent Application Laid-open (JP-A) No. 2007-277514 (paragraphs [0289] to [0429] of U.S. Patent Application No. 2010/233595, which is a counterpart publication). Specifically, the synthesis was as described below.

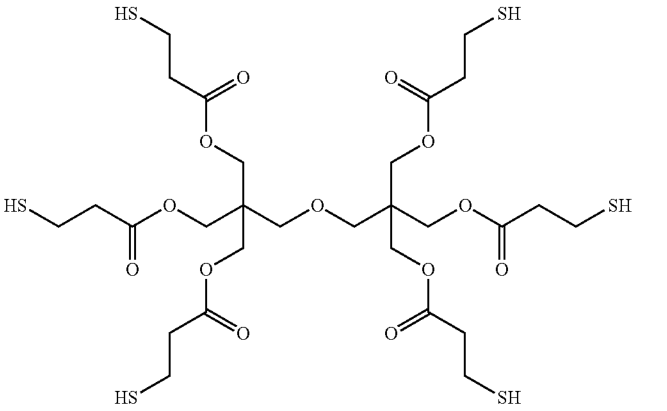

DPMP

+

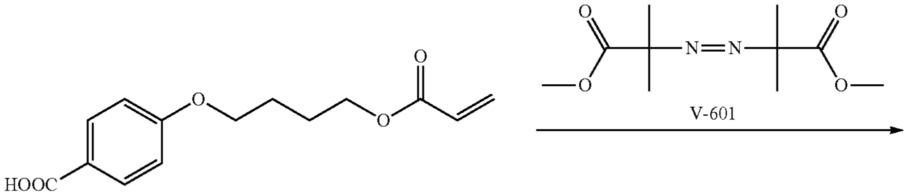

K-1

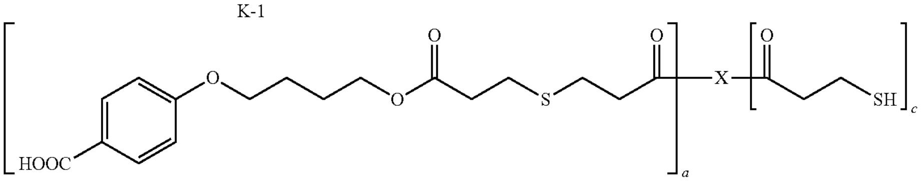

DPMP-K-1-1.8

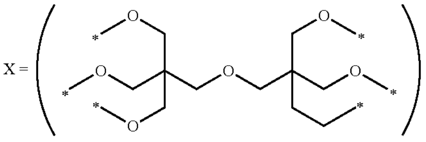

a/c = 1.8/4.2

18.86 parts by mass of dipentaerythritol hexakis(3-mercaptopropionate) [(DPMP), manufactured by Sakai Chemical Industry Co., Ltd.] and 11.36 parts by mass (1.8 equivalents relative to DPMP) of compound K-1 were dissolved in 70 parts by mass of cyclohexanone [manufactured by Fujifilm Wako Pure Chemical Corporation], and heated to 80 °C under nitrogen stream. The charging ratio above corresponded to a molar ratio of 1.0:1.8. 0.025 parts by mass of dimethyl 2,2'-azobis(2-methylpropionate) [V-601, manufactured by Fujifilm Wako Pure Chemical Corporation] were added thereto, and heated for 2 hours. Thereafter, 0.025 parts by mass of V-601 were further added, and reaction was allowed to proceed at 90 °C for 2 hours under nitrogen stream. The solution was cooled to room temperature (25 °C), as a result of which a 30% by mass solution of an intermediate (DPMP-K-1-1.8), in which compound (K-1) had been added to some of the sulfur atoms of the compound (DPMP), was obtained.

[Synthesis of Polymer Compound B-1]

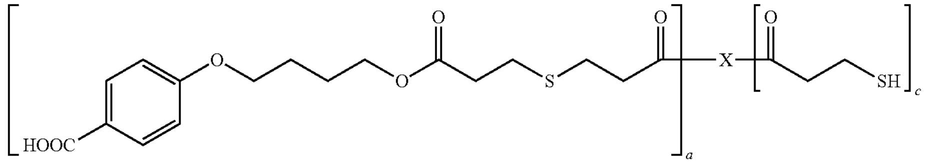

+

DPMP-K-1-1.8

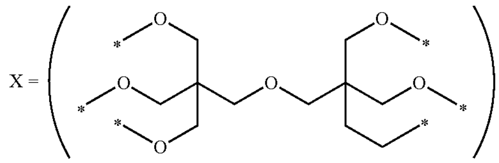

a/c = 1.8/4.2

-continued

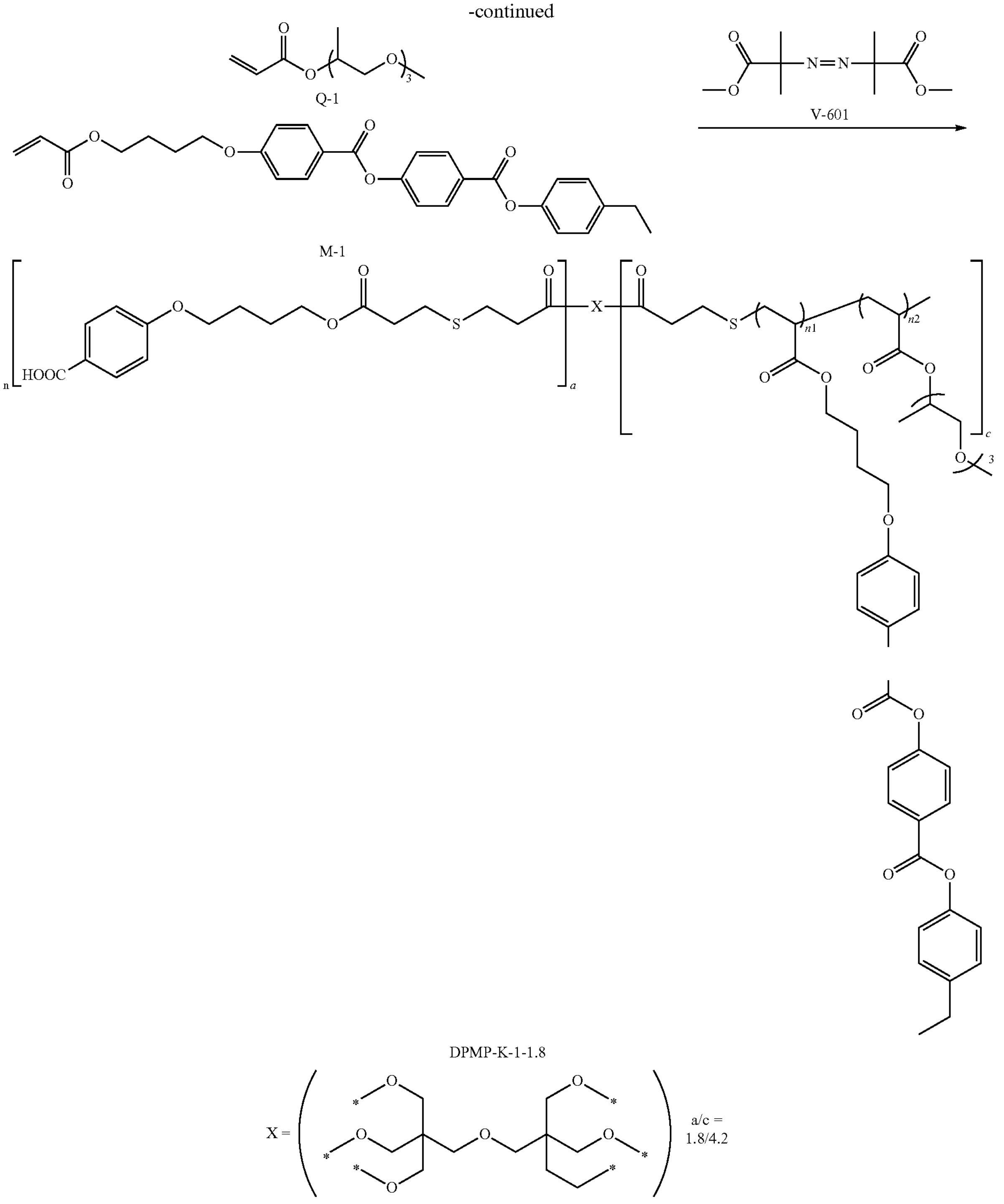

Q-1

M-1

DPMP-K-1-1.8

X = a/c = 1.8/4.2

4.2 parts by mass of cyclohexanone [manufactured by Fujifilm Wako Pure Chemical Corporation] was added into a three-necked flask, and heated to 80 °C under nitrogen stream. A mixed solution of 7.39 parts by mass of the above intermediate (DPMP-K-1-1.8), 4.45 part by mass of compound (Q-1), 13.34 parts by mass of compound (M-1), 1.02 parts by mass of dimethyl 2,2'-azobis(2-methylpropionate) [V-601, manufactured by Fujifilm Wako Pure Chemical Corporation], and 44.63 parts by mass of cyclohexanone [manufactured by Fujifilm Wako Pure Chemical Corporation] was dropwise added over 3 hours, and reaction was allowed to proceed for another 2 hours. Then, 0.031 parts by mass of V-601 were further added, and reaction was allowed to proceed at 90 °C for from 3 to 6 hours under nitrogen stream, until raw material monomer disappeared. Thereafter, the solution was cooled to room temperature, as a result of which a 25% by mass solution of a polymer compound (B-1, having a weight average molecular weight of 5,700, an acid value of 24 mgKOH/g, and crystallinity of Ne112Iso) was obtained.

[Synthesis of Polymer Compound B-12]

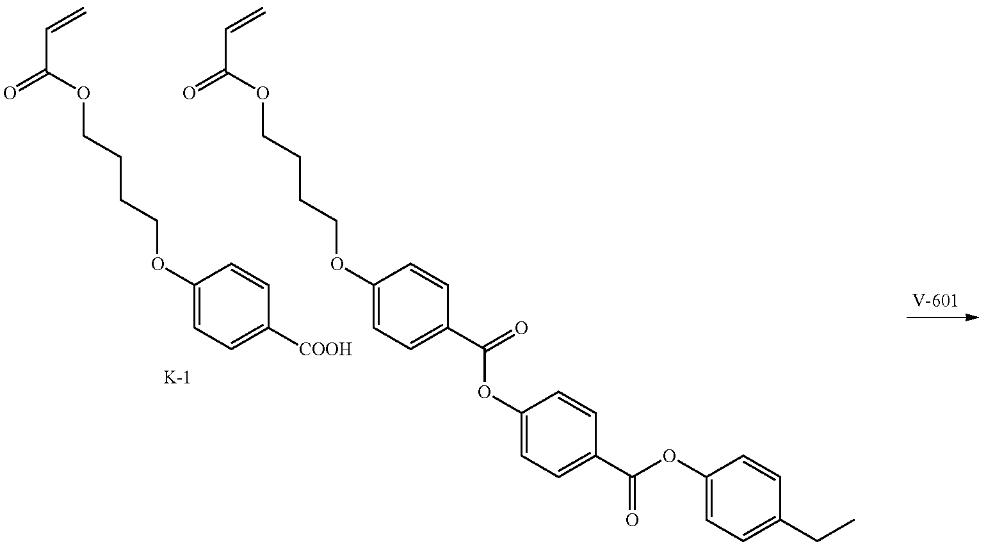

K-1

M-1

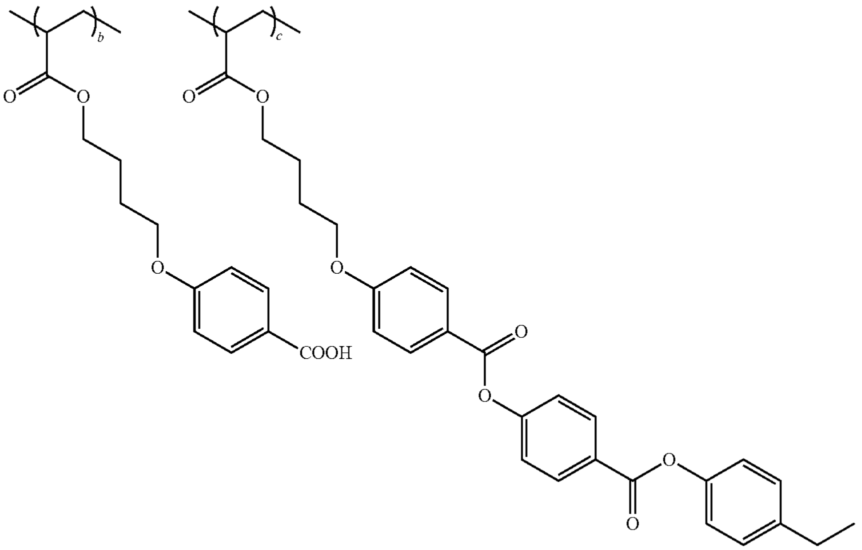

B-12

Into a three-necked flask, 1.0 parts by mass of cyclohexanone [manufactured by Fujifilm Wako Pure Chemical Corporation] was added, and heated to 80 °C under nitrogen stream. A mixed solution of 18.2 parts by mass of compound (M-1), 1.87 parts by mass of compound (K-1), 0.4 parts by mass of dimethyl 2,2'-azobis(2-methylpropionate) [V-601, manufactured by Fujifilm Wako Pure Chemical Corporation], and 33 parts by mass of cyclohexanone [manufactured by Fujifilm Wako Pure Chemical Corporation] was dropwise added thereto over 3 hours, and reaction was allowed to proceed for another 2 hours. Further, 0.05 parts by mass of V-601 were added, and reaction was allowed to proceed at 90 °C for 3 hours in nitrogen stream. Thereafter, the solution was cooled to room temperature, as a result of which a 25% by mass solution of a polymer compound (B-12, having a weight average molecular weight of 21,000 and a crystallinity of Ne182Iso) was obtained.

[Preparation of Base Material]

A 100 μm-thick polyethylene terephthalate (PET) film having an easy adhesion layer at one face thereof (COSMOSHINE A4160, manufactured by Toyobo Co., Ltd.) was provided as a base material, and a face thereof at which the easy adhesion layer was not disposed was subjected to rubbing treatment by being rubbed with KIMTOWEL for about 10 times.

[Formation of Liquid Crystal Film 1]

Ingredients of the following Liquid Crystal Composition 1 other than those coming from Composition 1-1 were mixed to form a solution in methyl ethyl ketone, and filtered through a filter having an opening of 0.45 μm. Thereafter, Composition 1-1 as prepared above was added and mixed thereinto, thereby preparing Liquid Crystal Composition 1 made up of the following ingredients.

—Make-Up of Liquid Crystal Composition 1—

Liquid Crystal Compound 1 having the structure shown below: 100 parts by mass

Composition 1-1 (a dispersion liquid having a concentration of zirconium oxide of 15% by mass): 33 parts by mass 25% by mass cyclohexanone solution of polymer compound B-1 (polymer compound B-1 corresponding to a polymer compound represented by Formula (1)): 120 parts by mass Photopolymerization Initiator (IRGACURE 907, manufactured by BASF): 0.5 parts by mass Surfactant 1 (a compound having the structure shown below): 0.06 parts by mass Surfactant 2 (a compound having the structure shown below): 0.05 parts by mass Organic Solvent 1 (methyl ethyl ketone, manufactured by Fujifilm Wako Pure Chemical Corporation): 360 parts by mass Liquid Crystal Compound 1: The Following Compound

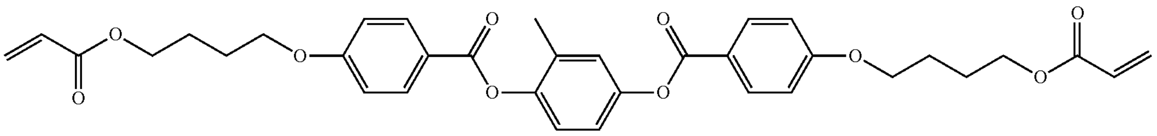 [SMILES: C=CC(=O)OCCCCOc1ccc(C(=O)Oc2ccc(OC(=O)c3ccc(OCCCCOC(=O)C=C)cc3)c(C)c2)cc1]

Surfactant 1: The Following Compound

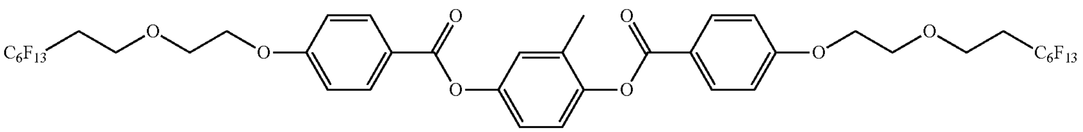

Surfactant 2: The Following Compound

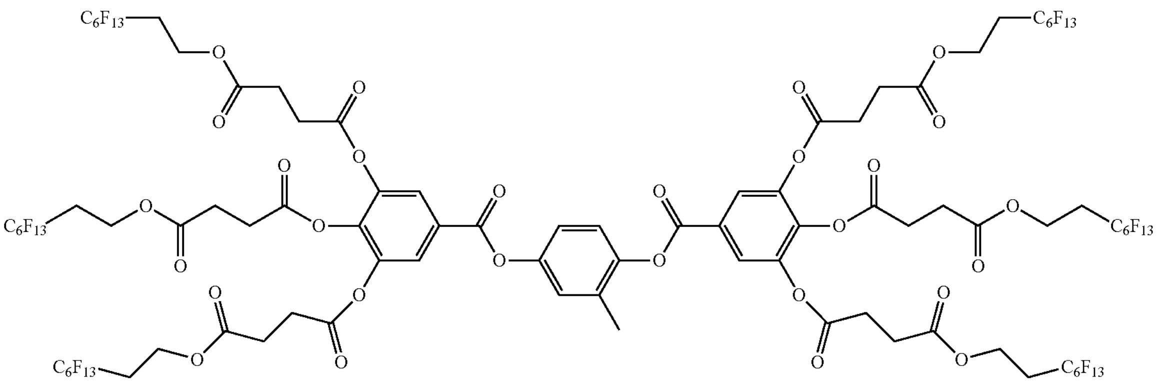

Using a #5 wire bar coater, Liquid Crystal Composition 1 was applied to the surface of the PET base material that had been subjected to rubbing treatment. Thereafter, drying was performed at 120 °C for 60 seconds, and the liquid crystal layer was cured by being irradiated with UV rays at 500 $mJ/cm^2$ at 90 °C in a nitrogen atmosphere, using a UV irradiation device (EXECURE 3000, manufactured by Hoya Corporation), thereby preparing Liquid Crystal Film 1.

[Measurement of Haze of Liquid Crystal Film 1]

The PET film on which Liquid Crystal Film 1 was applied, prepared as described above, was subjected to haze measurement using NDH-4000 (manufactured by Nippon Denshoku Industries, Co., Ltd.). For the measurement, the PET film that had been rubbed was used for adjustment.

The evaluation criteria are as follows.

A: Haze≤5

B: 5<Haze≤20

C: Haze>20

Examples 2 to 34 and Comparative Examples 1 and 2

Compositions and liquid crystal compositions were prepared in the same manner as that in Example 1, except that the kind and addition amount of the particles having a refractive index of 1.8 or less, and the kind, raw materials, and addition amounts of the compound represented by Formula (1), were changed as indicated in Table 1.

In Table 1, acid value, dispersing group, and mesogen group mean a raw material having an acid group and used in the synthesis of Formula (1), a raw material having a dispersing group, and a raw material having a mesogen structure, respectively.

In Table 1, addition amount as nano particles represents the parts by mass (phr) of nano particles with respect to 100 parts by mass of liquid crystal compound contained in the liquid crystal composition.

In Table 1, the mass ratio of acid groups is a value calculated according to the following Equation (B).

$$\text{Mass ratio of acid groups}=(\text{charging amount of the raw material having an acid group})/((\text{charging amount of the raw material having an acid group})+(\text{charging amount of the raw material having a dispersing group})+(\text{charging amount of the raw material having a mesogen structure})) \quad \text{Equation (B)}$$

In Table 1, the mass ratio of dispersing groups represents the mass of the raw material having a dispersing group relative to the total sum of the mass of the raw material having a dispersing group and the charging mass of the raw material having a mesogen structure; the mass ratio of mesogen structures represents the mass of the raw material having a mesogen structure relative to the total sum of the mass of the raw material having a dispersing group and the charging mass of the raw material having a mesogen structure.

In Table 1, amount of solution added to liquid crystal composition refers to the mass (phr) of the 25% by mass cyclohexanone solution of the polymer compound represented by Formula (1) added with respect to 100 parts by mass of liquid crystal compound contained in the liquid crystal composition.

The pKa values of B-3, B-4, and B-5 are 4.2, 3.85, and 9.69, respectively.

Evaluations were performed using the obtained compositions and liquid crystal compositions, in the same manner as that in Example 1.

The evaluation results are collectively indicated in Table 1.

TABLE 1

| | Particles Having Refractive Index of 1.8 or more | | Polymer Compound Represented by Formula (1) | | | |
|---|---|---|---|---|---|---|
| | Kind | Addition Amount as Nano Particles (phr) | Kind | Acid Group (Mass Ratio) | Dispersing Group (Mass Ratio) | Mesogen Structure (Mass Ratio) |
| Example 1 | $ZrO_2$(PCPR) | 5 | B-1 | K-1(0.11) | Q-1(25) | M-1(75) |
| Example 2 | $ZrO_2$(SZR-K) | 5 | B-1 | K-1(0.11) | Q-1(25) | M-1(75) |
| Example 3 | $ZrO_2$(SZR-K) | 5 | B-16 | K-1(0.11) | Q-1(50) | M-1(50) |
| Example 4 | $ZrO_2$(SZR-K) | 5 | B-2 | K-1(0.04) | Q-1(25) | M-1(75) |
| Example 5 | $ZrO_2$(SZR-K) | 5 | B-3 | K-2(0.04) | Q-1(25) | M-1(75) |
| Example 6 | $ZrO_2$(SZR-K) | 5 | B-4 | K-3(0.04) | Q-1(25) | M-1(75) |
| Example 7 | $ZrO_2$(SZR-K) | 5 | B-5 | K-4(0.04) | Q-1(25) | M-1(75) |
| Example 8 | $ZrO_2$(SZR-K) | 5 | B-6 | K-1(0.11) | Q-2(25) | M-1(75) |
| Example 9 | $ZrO_2$(SZR-K) | 5 | B-7 | K-1(0.11) | Q-3(25) | M-1(75) |
| Example 10 | $ZrO_2$(SZR-K) | 5 | B-8 | K-1(0.11) | Q-4(25) | M-1(75) |
| Example 11 | $ZrO_2$(SZR-K) | 5 | B-1 | K-1(0.11) | Q-1(25) | M-1(75) |
| Example 12 | $ZrO_2$(SZR-K) | 5 | B-1 | K-1(0.11) | Q-1(25) | M-1(75) |
| Example 13 | $ZrO_2$(SZR-K) | 5 | B-1 | K-1(0.11) | Q-1(25) | M-1(75) |
| Example 14 | $ZrO_2$(SZR-K) | 5 | B-1 | K-1(0.11) | Q-1(25) | M-1(75) |
| Example 15 | $ZrO_2$(SZR-K) | 5 | B-1 | K-1(0.11) | Q-1(25) | M-1(75) |
| Example 16 | $ZrO_2$(SZR-K) | 10 | B-1 | K-1(0.11) | Q-1(25) | M-1(75) |
| Example 16 | $ZrO_2$(SZR-K) | 10 | B-1 | K-1(0.11) | Q-1(25) | M-1(75) |
| Example 17 | $ZrO_2$(SZR-K) | 15 | B-1 | K-1(0.11) | Q-1(25) | M-1(75) |
| Example 18 | $ZrO_2$(SZR-K) | 15 | B-1 | K-1(0.11) | Q-1(25) | M-1(75) |
| Example 19 | ZP-153 | 5 | B-1 | K-1(0.11) | Q-1(25) | M-1(75) |
| Example 20 | $TiO_2$(TTO-51C) | 5 | B-1 | K-1(0.11) | Q-1(25) | M-1(75) |
| Example 21 | $ZrO_2$(SZR-K) | 5 | B-9 | K-1(0.11) | Q-1(25) | M-1(75) |
| Example 22 | $ZrO_2$(SZR-K) | 5 | B-10 | K-1(0.11) | Q-1(25) | M-1(75) |
| Example 23 | $ZrO_2$(SZR-K) | 5 | B-11 | K-1(0.11) | Q-1(100) | None |
| Example 24 | $ZrO_2$(PCPR) | 5 | B-12 | K-1(0.11) | None | M-1 (100) |
| Example 25 | $ZrO_2$(SZR-K) | 5 | B-13 | K-1(0.11) | Q-1(25) | M-2(75) |
| Example 26 | $ZrO_2$(SZR-K) | 5 | B-14 | K-1(0.11) | Q-1(25) | M-3(75) |

TABLE 1-continued

| | | | | | | |
|---|---|---|---|---|---|---|
| Example 27 | $ZrO_2$(SZR-K) | 5 | B-15 | K-1(0.11) | Q-1(25) | M-4(75) |
| Example 28 | $ZrO_2$(SZR-K) | 5 | B-17 | K-5(0.04) | Q-1(25) | M-1(75) |
| Example 29 | $ZrO_2$(SZR-K) | 5 | B-18 | K-5(0.11) | Q-1(25) | M-1(75) |
| Example 30 | $ZrO_2$(SZR-K) | 5 | B-19 | K-5(0.22) | Q-1(25) | M-1(75) |
| Example 31 | $ZrO_2$(SZR-K) | 5 | B-20 | K-1(0.22) | Q-1(25) | M-1(75) |
| Example 32 | $ZrO_2$(SZR-K) | 5 | B-21 | K-2(0.11) | Q-1(25) | M-2(75) |
| Example 33 | $ZrO_2$(SZR-K) | 5 | B-22 | K-2(0.11) | Q-1(25) | M-3(75) |
| Example 34 | $ZrO_2$(SZR-K) | 5 | B-23 | K-2(0.11) | Q-1(25) | M-4(75) |
| Comparative Example 1 | $ZrO_2$(SZR-K) | 5 | — | — | — | — |
| Comparative Example 2 | NO-0040-HP | 5 | B-2 | K-1(0.11) | Q-1(25) | M-1(75) |

| | Polymer Compound Represented by Formula (1) | | | | | |
|---|---|---|---|---|---|---|
| | Type of Polymer Compound | Presence Absence of Crystallinity | Mw | Amount of Solution Added to Liquid Crystal Composition (phr) | Particle Size Distribution (D50) | Haze (Liquid Crystal Film) |
| Example 1 | Type T-6 | Present | 5700 | 120 | A | A |
| Example 2 | Type T-6 | Present | 5700 | 120 | A | A |
| Example 3 | Type T-6 | Present | 8100 | 120 | A | A |
| Example 4 | Type T-6 | Present | 6700 | 120 | A | A |
| Example 5 | Type T-6 | Present | 7400 | 120 | A | A |
| Example 6 | Type T-6 | Present | 6100 | 120 | A | A |
| Example 7 | Type T-6 | Present | 7000 | 120 | B | B |
| Example 8 | Type T-6 | Present | 6000 | 120 | A | A |
| Example 9 | Type T-6 | Present | 7000 | 120 | A | A |
| Example 10 | Type T-6 | Present | 9000 | 120 | B | B |
| Example 11 | Type T-6 | Present | 5700 | 120 | A | A |
| Example 12 | Type T-6 | Present | 5700 | 80 | A | A |
| Example 13 | Type T-6 | Present | 5700 | 60 | A | A |
| Example 14 | Type T-6 | Present | 5700 | 40 | A | A |
| Example 15 | Type T-6 | Present | 5700 | 20 | A | A |
| Example 16 | Type T-6 | Present | 5700 | 40 | A | A |
| Example 16 | Type T-6 | Present | 5700 | 80 | A | A |
| Example 17 | Type T-6 | Present | 5700 | 60 | A | A |
| Example 18 | Type T-6 | Present | 5700 | 100 | A | A |
| Example 19 | Type T-6 | Present | 5700 | 120 | A | A |
| Example 20 | Type T-6 | Present | 5700 | 120 | A | A |
| Example 21 | Type T-6 | Present | 9000 | 120 | A | A |
| Example 22 | Type T-6 | Present | 12000 | 120 | A | B |
| Example 23 | Type T-6 | Absent | 5000 | 120 | A | B |
| Example 24 | Random Copolymerization | Present | 21000 | 120 | B | B |
| Example 25 | Type T-6 | Present | 6700 | 20 | B | B |
| Example 26 | Type T-6 | Present | 6700 | 20 | B | B |
| Example 27 | Type T-6 | Present | 6700 | 20 | B | B |
| Example 28 | Type T-6 | Present | 6700 | 120 | A | A |
| Example 29 | Type T-6 | Present | 6100 | 120 | A | A |
| Example 30 | Type T-6 | Present | 5000 | 120 | A | A |
| Example 31 | Type T-6 | Present | 7000 | 120 | A | A |
| Example 32 | Type T-6 | Present | 6200 | 120 | B | B |
| Example 33 | Type T-6 | Present | 6600 | 120 | B | B |
| Example 34 | Type T-6 | Present | 5500 | 120 | B | B |
| Comparative Example 1 | — | — | — | 120 | D | C |
| Comparative Example 2 | Type T-6 | Present | 6700 | 120 | C | C |

The acid group, dispersing group, and mesogen structure of the polymer compound represented by Formula (1) in Table 1 refer to a monomer for forming a structural unit having an acid group, a monomer for forming a structural unit having a dispersing group, and a monomer for forming a structural unit having a mesogen structure, respectively.

The simplified representations in Table 1, other than those described above, are as follows.

K-1

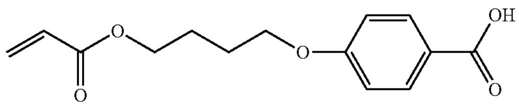

(pKa = 4.23)

K-2

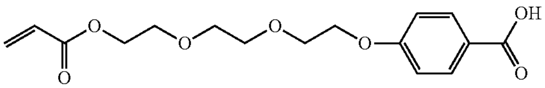

(pKa = 4.2)

K-3

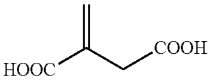

(pKa = 3.85)

K-4

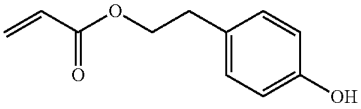

(pKa = 9.69)

-continued

K-5

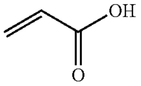

(pKa = 4.35)

Q-1 to Q-4: The Following Monomers

Q-1

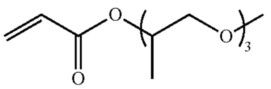

Q-2

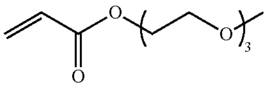

Q-3

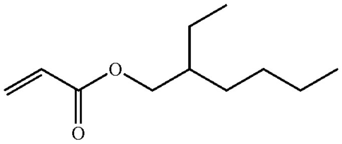

Q-4

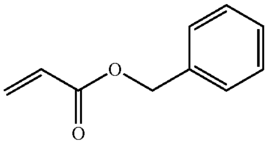

M-1 to M-4: The Following Monomers (Me Representing a Methyl Group)

M-1

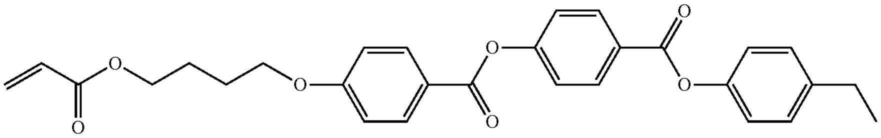

M-2

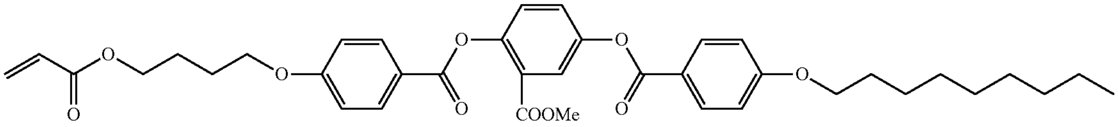

M-3

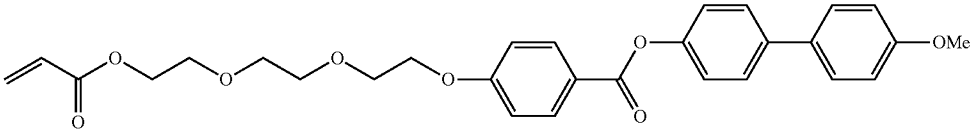

-continued

M-4

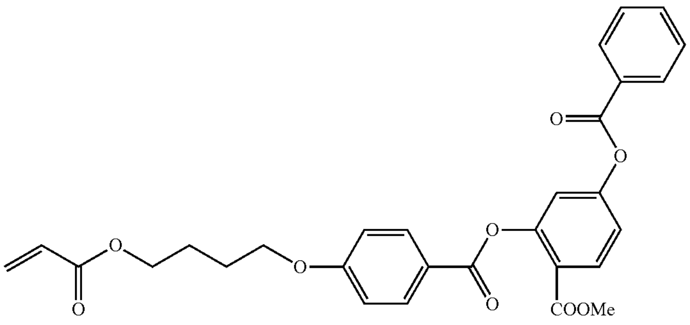

$ZrO_2$ (SZR-K): a solution in MEK having a concentration of zirconium oxide particles of 33% by mass, with an average primary particle size of 3 nm and a particle refractive index of 2.11, manufactured by Sakai Chemical Industry Co., Ltd.

ZP-153: ZIRCOSTAR ZP-153, which is a solution in MEK having a concentration of zirconium oxide particles of 70% by mass, with an average primary particle size of 11 nm and a particle refractive index of 1.8, manufactured by Nippon Shokubai Co., Ltd.

$TiO_2$ (TTO-5IC): Powder having a concentration of titanium oxide particles of 100% by mass, with an average particle size of from 10 nm to 30 nm and a particle refractive index of 2.6, manufactured by Ishihara Sangyo Kaisha Ltd.

NO-0040-HP: powder having silica ($SiO_2$) particle concentration of 100% by mass, with an average particle size of from 10 nm to 20 nm and a particle refractive index of 1.46 (500 nm), manufactured by IoLiTec.

As demonstrated in Table 1, the compositions of the Examples exhibited excellent dispersion stability of particles having a refractive index of 1.8 or more, as compared to the compositions of the Comparative Examples. Further, as demonstrated in Table 1, liquid crystal films having low haze can be obtained from the liquid crystal compositions of the Examples.

The disclosures of Japanese Patent Application No. 2022-156392, filed Sep. 29, 2022, and Japanese Patent Application No. 2023-141656, filed Aug. 31, 2023, are incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. A dispersant, comprising a polymer compound represented by the following Formula (1):

$$(A^1-R^2)_n R^1-(P^1)_m \tag{1}$$

wherein, in Formula (1), m represents a positive number of 8 or less; n represents a number of from 1 to 9; m+n is from 2 to 10; Formula (1) as a whole has at least one mesogen structure selected from the group consisting of a biphenyl structure, a phenyl benzoate structure, a cyclohexyl benzoate structure, an azobenzene structure, a stilbene structure, a terphenyl structure, an anthracene structure, derivatives thereof, and structures formed by connecting two or more of these mesogen structures via a connecting group, $R^1$ represents an (m+n)-valent connecting group; $R^2$ represents a single bond or a divalent connecting group; $A^1$ represents a monovalent group having at least one kind of group selected from the group consisting of an acid group, an alkyl group, and an aryl group; n $A^1$'s and n $R^2$'s may be the same or different; $P^1$ represents a polymer chain; and m $P^1$'s may be the same or different, provided that at least one of n $A^1$'s represents an alkyl group having an acid group or an aryl group having an acid group, and wherein an acid value of the polymer compound represented by Formula (1) is less than 100 mgKOH/g.

2. The dispersant according to claim 1, wherein m+n is from 3 to 6, and at least one of n $A^1$'s is a $C_1$-$C_{12}$ alkyl group having from 1 to 3 carboxylic acid groups or a $C_6$-$C_{10}$ aryl group having from 1 to 3 carboxylic acid groups.

* * * * *